(12) United States Patent
Iizuka et al.

(10) Patent No.: US 11,233,886 B2
(45) Date of Patent: Jan. 25, 2022

(54) STORAGE MEDIUM AND PACKET ANALYZING DEVICE

(71) Applicant: FUJITSU LIMITED, Kawasaki (JP)

(72) Inventors: Fumiyuki Iizuka, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/842,832

(22) Filed: Apr. 8, 2020

(65) Prior Publication Data

US 2020/0404081 A1 Dec. 24, 2020

(30) Foreign Application Priority Data

Jun. 20, 2019 (JP) .............................. JP2019-114218

(51) Int. Cl.
*H04L 29/06* (2006.01)
*H04L 12/26* (2006.01)

(52) U.S. Cl.
CPC .............. *H04L 69/22* (2013.01); *H04L 43/04* (2013.01); *H04L 43/067* (2013.01); *H04L 43/16* (2013.01)

(58) Field of Classification Search
CPC ....... H04L 69/22; H04L 43/04; H04L 43/067; H04L 43/16
See application file for complete search history.

(56) References Cited

U.S. PATENT DOCUMENTS

| 2008/0049738 | A1* | 2/2008 | Joung | ..................... H04L 43/16 370/356 |
| 2008/0298271 | A1* | 12/2008 | Morinaga | ............... H04L 43/00 370/252 |
| 2011/0280149 | A1* | 11/2011 | Okada | ..................... H04L 43/00 370/252 |

(Continued)

FOREIGN PATENT DOCUMENTS

| JP | 2012-191440 A | 10/2012 |
| JP | 2017-092762 A | 5/2017 |
| WO | 2018/131458 A1 | 7/2018 |

OTHER PUBLICATIONS

Extended European Search Report dated Sep. 1, 2020 for corresponding European Patent Application No. 20168205.1, 11 pages.

*Primary Examiner* — Nam T Tran
(74) *Attorney, Agent, or Firm* — Fujitsu Patent Center

(57) ABSTRACT

A non-transitory computer-readable storage medium storing a packet analysis program for causing a computer to execute a process, the process includes acquiring packets communicated between nodes, adding information of communication of ongoing couplings to an ongoing coupling list in each of predetermined time ranges belonging to start times of the couplings based on the packets, and removing information of communication of a terminated coupling from the ongoing coupling list based on the packets, and analyzing the quality of the communication of the terminated coupling in a cycle corresponding to a time range among the time ranges, and analyzing the quality of communication related (Continued)

to a coupling present in the ongoing coupling list even when the cycle has elapsed a predetermined number of times or more after the addition of information of the coupling to the ongoing coupling list.

12 Claims, 29 Drawing Sheets

(56) References Cited

U.S. PATENT DOCUMENTS

| | | | |
|---|---|---|---|
| 2014/0247735 A1* | 9/2014 | Tanaka | H04W 24/10 370/252 |
| 2015/0043351 A1 | 2/2015 | Ohkawa et al. | |
| 2017/0264558 A1* | 9/2017 | Higuchi | H04L 43/0829 |
| 2019/0334799 A1 | 10/2019 | Iizuka et al. | |

* cited by examiner

FIG. 8

COUPLING MANAGEMENT TABLE 122

| COUPLING ID | SOURCE IP ADDRESS | DESTINATION IP ADDRESS | PROTOCOL NUMBER | SOURCE PORT NUMBER | DESTINATION PORT NUMBER | EXPERIENCED DELAY MEASUREMENT INFORMATION POINTER |
|---|---|---|---|---|---|---|
| CON1 | 10.20.30.40 | 10.20.30.50 | 6 | 2000 | 20 | *P1 |
| CON2 | 20.30.40.50 | 10.20.30.60 | 6 | 3000 | 80 | *P2 |
| CON3 | 30.40.50.60 | 40.50.60.70 | 17 | 4000 | 3000 | *P3 |
| ... | ... | ... | ... | ... | ... | ... |

FIG. 10

EXPERIENCED DELAY MEASUREMENT OUTPUT INFORMATION — 142a

| OUTPUT TIME | SOURCE IP ADDRESS | DESTINATION IP ADDRESS | PROTOCOL NUMBER | SOURCE PORT NUMBER | DESTINATION PORT NUMBER | START TIME | END TIME |
|---|---|---|---|---|---|---|---|
| 0:01:00 | 10.20.30.40 | 10.20.30.50 | 6 | 2000 | 20 | 0:00:05 | - |
| 0:01:00 | 20.30.40.50 | 10.20.30.60 | 6 | 3000 | 80 | 0:00:17 | - |
| 0:01:00 | 30.40.50.60 | 40.50.60.70 | 17 | 4000 | 3000 | 0:00:45 | - |
| ... | ... | - | ... | ... | ... | ... | ... |

EXPERIENCED DELAY MEASUREMENT OUTPUT INFORMATION — 142a

| COUPLING ESTABLISHMENT PERIOD | SYN RETRANSMISSION PERIOD | CLIENT DEVICE PROCESSING PERIOD | SERVER PROCESSING PERIOD | SERVER DATA TRANSFER PERIOD | SERVER DATA RETRANSMISSION PERIOD | CLIENT DEVICE DATA TRANSFER PERIOD | CLIENT DEVICE DATA RETRANSMISSION PERIOD | ... |
|---|---|---|---|---|---|---|---|---|
| 5 | 0 | 60 | 80 | 10 | 0 | 0 | 0 | ... |
| 35 | 0 | 20 | 50 | 20 | 0 | 10 | 0 | ... |
| 20 | 0 | 15 | 200 | 12 | 0 | 12 | 0 | ... |
| ... | ... | ... | ... | ... | ... | ... | ... | ... |

FIRST COMPARATIVE EXAMPLE (FIRST PART)

FIG. 22

132b — EXPERIENCED DELAY MEASUREMENT INFORMATION

| COUPLING ID | START TIME | END TIME | COUPLING ESTABLISHMENT PERIOD | SYN RETRANSMISSION PERIOD | CLIENT DEVICE PROCESSING PERIOD | ... |
|---|---|---|---|---|---|---|
| CON1 | 0:00:05 | — | 5 | 0 | 10 | ... |
| ... | ... | ... | ... | ... | ... | ... |

132b — EXPERIENCED DELAY MEASUREMENT INFORMATION

| COUPLING ESTABLISHMENT PERIOD UPDATE INFORMATION | SYN RETRANSMISSION PERIOD UPDATE INFORMATION | CLIENT DEVICE TRANSFER PERIOD UPDATE INFORMATION | CLIENT DEVICE RETRANSMISSION PERIOD UPDATE INFORMATION | SERVER TRANSFER PERIOD UPDATE INFORMATION | SERVER RETRANSMISSION PERIOD UPDATE INFORMATION | CLIENT DEVICE PROCESSING PERIOD UPDATE INFORMATION | SERVER PROCESSING PERIOD UPDATE INFORMATION | IDLE PERIOD UPDATE INFORMATION |
|---|---|---|---|---|---|---|---|---|
| 0 | 0 | 1 | 0 | 1 | 0 | 0 | 1 | 0 |
| ... | ... | ... | ... | ... | ... | ... | ... | ... |

UPDATE POINT PATTERN TABLE (123)

| COUPLING ESTABLISHMENT | SYN RETRANSMISSION PERIOD | CLIENT DEVICE TRANSFER PERIOD | CLIENT DEVICE RETRANSMISSION PERIOD | SERVER TRANSFER PERIOD | SERVER RETRANSMISSION PERIOD | CLIENT DEVICE PROCESSING PERIOD | SERVER PROCESSING PERIOD | IDLE PERIOD |
|---|---|---|---|---|---|---|---|---|
| 1 | 1 | 1 | 2 | 1 | 2 | 3 | 3 | 0 |

UPDATE MANAGEMENT BITMAP (135)

| COUPLING ESTABLISHMENT | SYN RETRANSMISSION PERIOD | CLIENT DEVICE TRANSFER PERIOD | CLIENT DEVICE RETRANSMISSION PERIOD | SERVER TRANSFER PERIOD | SERVER RETRANSMISSION PERIOD | CLIENT DEVICE PROCESSING PERIOD | SERVER PROCESSING PERIOD | IDLE PERIOD |
|---|---|---|---|---|---|---|---|---|
| 0 | 0 | 1 | 0 | 1 | 0 | 0 | 1 | 0 |

| | | |
|---|---|---|
| 1 | 1 | 3 |

5 IN TOTAL (EFFECT LEVEL)

STORAGE MEDIUM AND PACKET ANALYZING DEVICE

CROSS-REFERENCE TO RELATED APPLICATION

This application is based upon and claims the benefit of priority of the prior Japanese Patent Application No. 2019-114218, filed on Jun. 20, 2019, the entire contents of which are incorporated herein by reference.

FIELD

The present invention is related to a storage medium and a packet analyzing device.

BACKGROUND

Currently, an information processing system including various devices is used. The devices are coupled to and communicate with each other via a network, a predetermined cable, or the like. As a protocol for packetization and transmission of data on the network, there is Transmission Control Protocol/Internet Protocol (TCP/IP).

In this case, it is considered that packets transmitted and received via the network are collected and the quality of communication is measured based on the packets. For example, there is a proposal for a communication quality measuring device for managing, as attribute information, types of captured packets and arrival times in units of couplings. The proposed communication quality measuring device extracts positional. Information of a client device from a captured packet, adds the positional. Information to the attribute information, and analyzes the quality of communication of the client device based on a position based on the positional information based on the attribute. Information of each packet for each of the couplings.

There is a proposal for a radio communication system that selects a frequency band in a heterogeneous network environment in which cells of different sizes and different frequencies (frequency bands) exist. In the proposed radio communication system, handover (HO) between different frequencies is executed based on a radio resource amount requested by an application even in a state in which actual radio resource utilization is high. Therefore, a bias in resource amounts requested for frequency bands is corrected, and the quality of experience (QoE) (for example, a service quality, experienced by a user, of a service that is an IP phone service, a video distribution, or the like) that is reduced by intensive use of an application is improved.

For example, as related art, Japanese Laid-open Patent Publication No. 2012-191440, Japanese Laid-open Patent Publication No. 2017-92762, and the like are disclosed.

SUMMARY

According to an aspect of the embodiments, a non-transitory computer-readable storage medium storing a packet analysis program for causing a computer to execute a process, the process includes acquiring packets communicated between nodes, adding information of communication of ongoing couplings to an ongoing coupling list in each of predetermined time ranges belonging to start times of the couplings based on the packets, and removing information of communication of a terminated coupling from the ongoing coupling list based on the packets, and analyzing the quality of the communication of the terminated coupling in a cycle corresponding to a time range among the time ranges, and analyzing the quality of communication related to a coupling present in the ongoing coupling list even when the cycle has elapsed a predetermined number of times or more after the addition of information of the coupling to the ongoing coupling list.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a coupling management table;

FIG. 10 is a diagram illustrating an example of experienced delay measurement output information;

FIG. 22 is a diagram illustrating an example of the experienced delay measurement information;

FIG. 23 is a diagram illustrating an example of the calculation of an effect level;

DESCRIPTION OF EMBODIMENTS

A device for analyzing a packet analyzes the quality of communication of a network based on a packet communicated between nodes. In recent years, the analysis of the quality of communication per service is executed in some cases, instead of the analysis of the quality of communication for each of individual packets.

In this case, for example, a method is considered, which causes a device for analyzing a packet to aggregate, in a predetermined cycle (statistical cycle), a time period for data transfer between nodes, a time period for processing in the nodes, and the like for a service for which access (for example, a coupling between nodes) from a user has finished, and analyze the quality of communication. In this method, however, when communication between nodes is continuously executed for a long time period and service access is made, there is a problem that a coupling between the nodes is not terminated and the analysis of the quality of communication is not executed for a long time period in some cases.

According to an aspect, an object of the invention is to provide a packet analysis program and a packet analyzing device that are able to analyze the quality of communication for a coupling continuously established in continuous statistical cycles.

According to one aspect, it is possible to analyze the quality of communication for a coupling continuously established in continuous statistical cycles.

Hereinafter, embodiments are described with reference to the drawings.

First Embodiment

A first embodiment is described.

Figure 1:
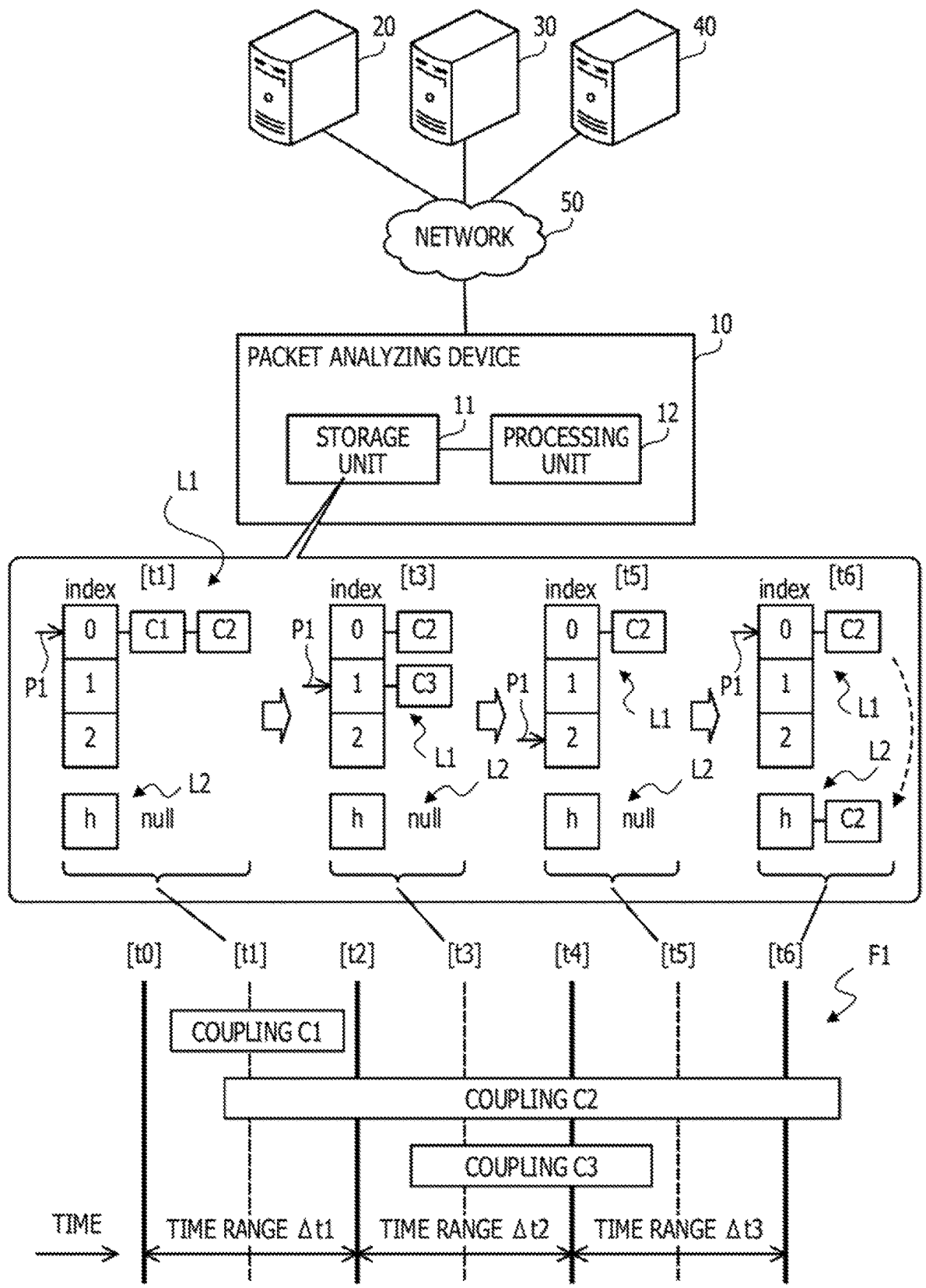
FIG. 1 is a diagram illustrating a packet analyzing device according to a first embodiment.

FIG. 1 is a diagram illustrating a packet analyzing device according to the first embodiment.

The packet analyzing device 10 is coupled to nodes 20, 30, and 40 via a network 50. The packet analyzing device 10 acquires, from the network 50, a packet transmitted and received between two nodes (or between the nodes) and measures the quality of communication between the nodes. For example, a relay device belonging to the network 50 copies a packet communicated between nodes and transmits the copied packet to the packet analyzing device 10, and the packet analyzing device 10 receives the copied packet, thereby acquiring the packet.

The packet analyzing device 10 includes a storage unit 11 and a processing unit 12. The storage unit 11 may be a volatile storage device, such as a random-access memory (RAM), or may be a nonvolatile storage device, such as a hard disk drive (HDD) or a flash memory. The processing unit 12 may include a central processing unit (CPU), a digital signal processor (DSP), an application-specific integrated circuit (ASIC), a field-programmable gate array (FPGA), and the like. The processing unit 12 may be a processor that executes a program. The "processor" may include a set (multi-processor) of multiple processors.

The storage unit 11 stores the packet acquired by the packet analyzing device 10. A timestamp indicating the time (acquisition time) when the packet has been acquired may be added to the packet. The storage unit 11 stores an ongoing coupling list L1. In the ongoing coupling list L1, information of communication of ongoing couplings is recorded. The storage unit 11 stores an intermediate output list L2. In the intermediate output list L2, information of communication related to a coupling to be subjected to communication quality analysis among the ongoing couplings is recorded. Each of the ongoing coupling list L1 and the intermediate output list L2 is data having a list structure. In each of the list structures, multiple list elements are coupled to each other by a pointer.

The processing unit 12 acquires the packet communicated between the nodes and causes the packet to be stored in the storage unit 11. The processing unit 12 may add the acquisition time to the acquired packet.

For example, according to TCP, a coupling is established by transmission of a SYN packet from a first node to a second node. According to TCP, the coupling is canceled (or terminated) by transmission of a FIN packet or an RST packet from the first node to the second node. Therefore, the processing unit 12 may detect the establishment of the coupling between the first and second nodes by detecting the SYN packet (or a group of a series of packets including the SYN packet between the nodes) from the first node to the second node. The processing unit 12 may detect the termination of the coupling between the first and second nodes by detecting the FIN or RST packet (or a group of a series of packets including the FIN or RST packet between the nodes) from the first node to the second node. A coupling is identified by, for example, IP addresses, port numbers, and protocol numbers of the nodes that communicate with each other. Information of the IP addresses, the port numbers, and the protocol numbers of the nodes that communicate with each other is stored in a header of the packet.

The processing unit 12 adds, based on the acquired packet, information of the communication of ongoing couplings to the ongoing coupling list L1 for each of predetermined time ranges to which start times of the couplings belong. In the ongoing coupling list L1, the information of the communication related to the ongoing couplings is recorded. The processing unit 12 removes, from the ongoing coupling list L1, the information of the communication of a coupling that has been terminated. However, even when the information of the communication is removed from the ongoing coupling list L, details of the information of the communication remain in the storage unit 11 to analyze the quality of the communication.

The processing unit 12 analyzes, in a cycle corresponding to a time range, the quality of communication of the terminated coupling. The length of the single time range corresponds to the cycle. For example, the coupling to be analyzed is terminated in a previous time range. The processing unit 12 suspends the analysis of the quality of communication related to a coupling that is present in the ongoing coupling list L1 until the cycle continuously repeats a predetermined number N of times after the addition of information of the coupling to the ongoing coupling list L1 in the cycle corresponding to the time range. N is an integer of 1 or greater.

The ongoing coupling list L1 includes sublists for respective predetermined time ranges. A top element of 1 sublist is identified by an index. In an example of the ongoing coupling list L1, indices are "0", "1", and "2". In this case, the number of sublists belonging to the ongoing coupling list L1 is 3. The number of sublists belonging to the ongoing coupling list L1 is determined based on how many times the cycle T (statistical cycle T) that corresponds to a time range has continuously repeated in a state in which a coupling is continuously established before the analysis of the quality of communication of the ongoing coupling. For example, the number of sublists is determined based on the predetermined number N of times. For example, the number of sublists is N+1. In the example illustrated in FIG. 1, the predetermined number N of times=2, and the number of sublists=2+1=3.

When the number of sublists is 3, the sublists that are destinations to which information of couplings are added are repeatedly applied in respective 3 cycles. When information of a coupling that has been added to a sublist in a certain time range remains in the sublist after the sublists are applied in respective 3 cycles, the coupling (information of the coupling) is present in the ongoing coupling list L1 for a time period for which the coupling is continuously established and in which the cycle T has continuously repeated a predetermined number N+1 of times or more. When the sublists are applied in the respective 3 cycles, the processing unit 12 migrates, to the intermediate output list L2, information of a coupling remaining in a sublist associated with a time range from the time when the sublists are applied in the respective 3 cycles, and treats the coupling as a target to be subjected to communication quality analysis when the sublists are applied in the respective 3 cycles.

For example, FIG. 1 illustrates a time chart F1 indicating an example of observation of couplings C1, C2, and C3 by the processing unit 12. In the time chart F1, a direction from the left side to the right side is a positive direction of time. Times t0, t1, t2, t3, t4, t5, and t6 indicate times in the time chart F1. A "time" may be considered to indicate a certain time point or may be considered to indicate a relatively short time range including the time point.

The times t0, t2, t4, and t6 are times when the quality of communication is analyzed. The analysis is executed at fixed intervals, each of which corresponds to the cycle T. A time range Δt1 is from the time t0 to the time 2. A time range Δt2 is from the time t2 to the time t4. A time range Δt3 is from the time t4 to the time t6. Each of lengths of the time ranges Δt1, Δt2, and Δt3 corresponds to the cycle T.

For example, the time range Δt1 is associated with the index "0" of the ongoing coupling list L. The time range Δt2 is associated with the index "1" of the ongoing coupling list L1. The time range Δt3 is associated with the index "2" of the ongoing coupling list L1. In the example illustrated in FIG. 1, since the sublists of the ongoing coupling list L1 are repeatedly applied in respective 3 cycles, a time range (time range of the same length as the cycle T starting from the time t6) immediately after the time range Δt3 is associated with the index "0" of the ongoing coupling list L1. After that, similarly, while the indices of the ongoing coupling list L are repeatedly set in the order of the indices "1", "2", "0", "1", . . . , the subsequent time ranges of the same length as the cycle T may be associated with the indices "1", "2", "0", "1", . . . of the ongoing coupling list L1.

In the ongoing coupling list L, a pointer P1 is used to manage an index associated with the current time range. The pointer P1 is information indicating the index associated with the current time range. For example, the pointer P1 indicates the index "0" in the time range Δt1. The pointer P1 indicates the index "1" in the time range Δt2. The pointer P1 indicates the index "2" in the time range Δt3. The pointer P1 indicates the index "0" in the time range immediately after the time range 3.

This case assumes that an observed coupling does not exist before the time t0. At the time t0, the processing unit 12 sets a pointing destination of the pointer P1 to the index "0". Before the time t0, an observed coupling does not exist, and thus the intermediate output list L2 is "null". "null" indicates that a list element is not registered. At the time t0, the processing unit 12 does not analyze the quality of communication.

For example, in the time range Δt1, the processing unit 12 detects that the couplings C1 and C2 have been newly established. Then, the processing unit 12 adds information of communication of the couplings C1 and C2 to the sublist of the index "0", associated with the time range Δt1, of the ongoing coupling list L1. For example, at the time t1 belonging to the time range Δt1, the information of the communication of the couplings C1 and C2 is already registered in the sublist of the index "0". "Information of communication" is, for example, information to be used to analyze the quality of the communication of a concerned coupling and may include communication identification information of IP addresses, port numbers, and the like of both nodes related to the coupling and measurement information of data transfer periods, retransmission periods, and the like. The communication identification information is identification information of a communication flow (coupling) and includes, for example, a combination of the following 5 information items (5 tuples). The 5 information items are a source IP address (Source IP), a destination IP address (Destination IP), a source port number (Source Port), a destination port number (Destination Port), and a protocol (Protocol). Alternatively, the "information of the communication" may be addresses indicating storage regions that are included in the storage unit 11 and in which the communication identification information, the measurement information, and the like are stored. The intermediate output list L2 at the time t1 is "null".

In the time range Δt1, the coupling C1 is terminated. Upon detecting the termination of the coupling C1, the processing unit 12 removes the information of the coupling C1 from the sublist of the index "0" of the ongoing coupling list L1. Communication identification information of IP addresses, port numbers, and the like of both nodes related to the coupling C1, and measurement information of data transfer periods, retransmission periods, and the like are held in the storage unit 11 as the information of the communication of the coupling C1 terminated in the time range Δt1.

At the time t2, the processing unit 12 sets the pointing destination of the pointer P1 to the index "1". At the time t2, the intermediate output list L2 is "null". The processing unit 12 analyzes the quality of the communication related to the coupling C1 terminated in the time range Δt1 and outputs a result of the analysis. At the time t2, the coupling C2 is not terminated. Therefore, at the time t2, the processing unit 12 does not analyze the quality of the communication related to the coupling C2.

In the time range Δt2, the processing unit 12 detects that the coupling C3 has been newly established. Then, the processing unit 12 adds information of communication of the coupling C3 to the sublist of the index "1", associated with the time range Δt2, of the ongoing coupling list L1. For example, at the time t3 belonging to the time range Δt2, the information of the communication of the coupling C2 is already registered in the sublist of the index "0", and the information of the communication of the coupling C3 is already registered in the sublist of the index "1". The intermediate output list L2 at the time t3 is "null".

At the time t4, the processing unit 12 sets the pointing destination of the pointer P1 to the index "2". At the time t4, the intermediate output list L2 is "null". At the time t4, the couplings C2 and C3 are not terminated. Therefore, at the time t4, the processing unit 12 does not analyze the quality of the communication related to the couplings C2 and C3.

In the time range Δt3, the coupling C3 is terminated. Upon detecting the termination of the coupling C3, the processing unit 12 removes the information of the coupling C3 from the sublist of the index "1" of the ongoing coupling list L1. Communication identification information of IP addresses, port numbers, and the like of both nodes related to the coupling C3, and measurement information of data transfer periods, retransmission periods, and the like are held in the storage unit 11 as the information of the communication of the coupling C3 terminated in the time range Δt3. For example, at the time t5 that belongs to the time range Δt3 and is after the removal, the information of the communication of the coupling C2 is already registered in the sublist of the index "0". The intermediate output list L2 at the time t5 is "null".

At the time t6, the processing unit 12 analyzes the quality of the communication related to the coupling C3 terminated in the time range Δt3 and outputs a result of the analysis.

At the time t6, the processing unit 12 sets the pointing destination of the pointer P1 to the index "0". In this case, the information of the communication of the coupling C2 is registered in the index "0" of the ongoing coupling list L1. In this case, the processing unit 12 determines that the cycle T has continuously repeated 3 times (=the predetermined number N of times+1) in a state in which the coupling C2 is continuously established. Then, the processing unit 12 adds, to the intermediate output list L2, the information, registered in the sublist of the index "0" of the ongoing coupling list L1, of the communication of the coupling C2. In this case, the processing unit 12 removes the information of the communication of the coupling C2 from the sublist of the index "0". Then, at the time t6, the processing unit 12 analyzes the quality of the communication of the coupling C2 based on the intermediate output list 12. The processing unit 12 outputs a result of analyzing the quality of the communication of the coupling C2. The information of the communication of the coupling C2 in the intermediate output list L2 is deleted when the coupling C2 is terminated.

Until the coupling C2 is terminated, the information of the communication of the coupling C2 remains in the intermediate output list L2. Therefore, during the time when the coupling C2 is continuously established, the processing unit 12 outputs a result of analyzing the quality of the communication of the coupling C2 every time the statistical cycle comes.

It is, therefore, possible to analyze the quality of communication of a coupling continuously established in continuous statistical cycles.

Especially, a load of the packet analyzing device 10 may be reduced by treating, as a target to be subjected to the communication quality analysis, a coupling continuously established for a time period in which the statistical cycle has continuously repeated the predetermined number (for example, 2) of times or more, compared to the case where all couplings that are continuously established in each statistical cycle are to be analyzed. For example, although it is considered that all couplings that are continuously established in each statistical cycle are to be analyzed, the packet analyzing device 10 easily becomes highly loaded. In this case, the probability that the packet analyzing device 10 is not able to complete the analysis before the next statistical cycle increases, and it may take time to recognize the latest communication status. Thus, the packet analyzing device 10 may treat, as a target to be subjected to the communication quality analysis, a coupling continuously established for a time period in which the statistical cycle has continuously repeated the predetermined number of times or more. Therefore, the packet analyzing device 10 may reduce the load of the packet analyzing device 10, suppress a delay in the analysis, and quickly recognize the latest communication status.

Since it is sufficient if the packet analyzing device 10 determines whether the statistical cycle has elapsed the predetermined number of times or more after adding information of each coupling to the ongoing coupling list L1, the packet analyzing device 10 may quickly determine a target to be analyzed. For example, it is considered that a time elapsed after the start (establishment) of a coupling is measured and compared with a threshold or the like and a coupling that is continuously established for a time period longer than the threshold is to be analyzed. In this method, however, as the number of couplings increases, processing costs for the measurement of elapsed time periods for which the couplings are continuously established and the comparison with the threshold increase, and it takes time to determine a target to be analyzed. On the other hand, as described above, the packet analyzing device 10 uses the ongoing coupling list L1 to more quickly determine a target to be analyzed, compared to the method of measuring the elapsed time periods for which the couplings are continuously established and comparing the time periods with the threshold.

The storage unit 11 may further store effect level information indicating effect levels of delay times for measurement items measured for a coupling on the quality of communication and update management information indicating whether the measurement items in a previous time range have been updated. For example, the processing unit 12 records updates of the measurement items in the update management information. As the measurement items, a data transfer period for data transfer between nodes to be used to measure a delay time experienced by a user as the quality of communication, a time period for processing in the nodes, and the like are considered. The processing unit 12 selects, based on the effect level information and the update management information, a coupling to be subjected to the communication quality analysis from among multiple couplings present in the ongoing coupling list L1 even when the cycle T has elapsed the predetermined number of times after the addition of information of the couplings to the ongoing coupling list L. By executing this, it is possible to appropriately select, as a target to be subjected to the communication quality analysis, a coupling for which a measurement item that highly affects the quality of communication has been measured, from among ongoing couplings. A processing load of the packet analyzing device 10 may be further reduced, compared to the case where all multiple ongoing couplings that are candidates to be analyzed are to be analyzed.

As an example, the processing unit 12 calculates, based on the effect level information and the update management information, the sum of effect levels for updated measurement items for each of couplings. Then, the processing unit 12 may prioritize a coupling of which the sum of effect levels is the largest among the multiple couplings that are candidates to be analyzed, and select the prioritized coupling as a target to be subjected to the communication quality analysis.

The processing unit 12 may calculate, based on a distribution of past measured values of delay times for the measurement items, a statistical value based on the distribution, and correct effect levels of the measurement items in the effect level information based on the statistical value. For example, an effect level of each measurement item on the quality of communication may vary. As an example, in the case where a processing period of a certain node is considered as a measurement item, as the processing period increases, an effect level of the processing period on the quality of communication also increases. When a past measured value of a measurement item tends to increase according to results of measuring the measurement item, the processing unit 12 increases an effect level of the concerned measurement item. When the measured value tends to decrease, the processing unit 12 reduces the effect level of the concerned measurement item. It is, therefore, possible to update the effect level based on a current state of service provision by each node, and appropriately select a coupling to be actually analyzed from among the multiple ongoing couplings that are candidates to be analyzed.

The processing unit 12 may estimate a time period tx for first analysis of the quality of communication of a terminated coupling. The processing unit 12 may determine, based on the time period tx and the cycle T, the number of couplings to be actually subjected to the communication quality analysis among the multiple ongoing couplings that are candidates to be analyzed. For example, the processing unit 12 may determine the number of couplings to be subjected to the communication quality analysis so that the first analysis and second analysis of the quality of communication related to the couplings present in the ongoing coupling list L1 are completed within a next cycle. For example, the processing unit 12 may determine the number of couplings to be subjected to the second analysis by dividing a time period obtained by subtracting the time period tx from the cycle T by a time period (for example, a time period obtained from results) for a process of analyzing the quality of communication per ongoing coupling. Thus, the first analysis and the second analysis may be completed within the next cycle, and a delay in the output of the analysis results is shorter than the cycle T. Therefore, the user may quickly recognize analysis results for each cycle.

Second Embodiment

Next, a second embodiment is described.

Figure 2:
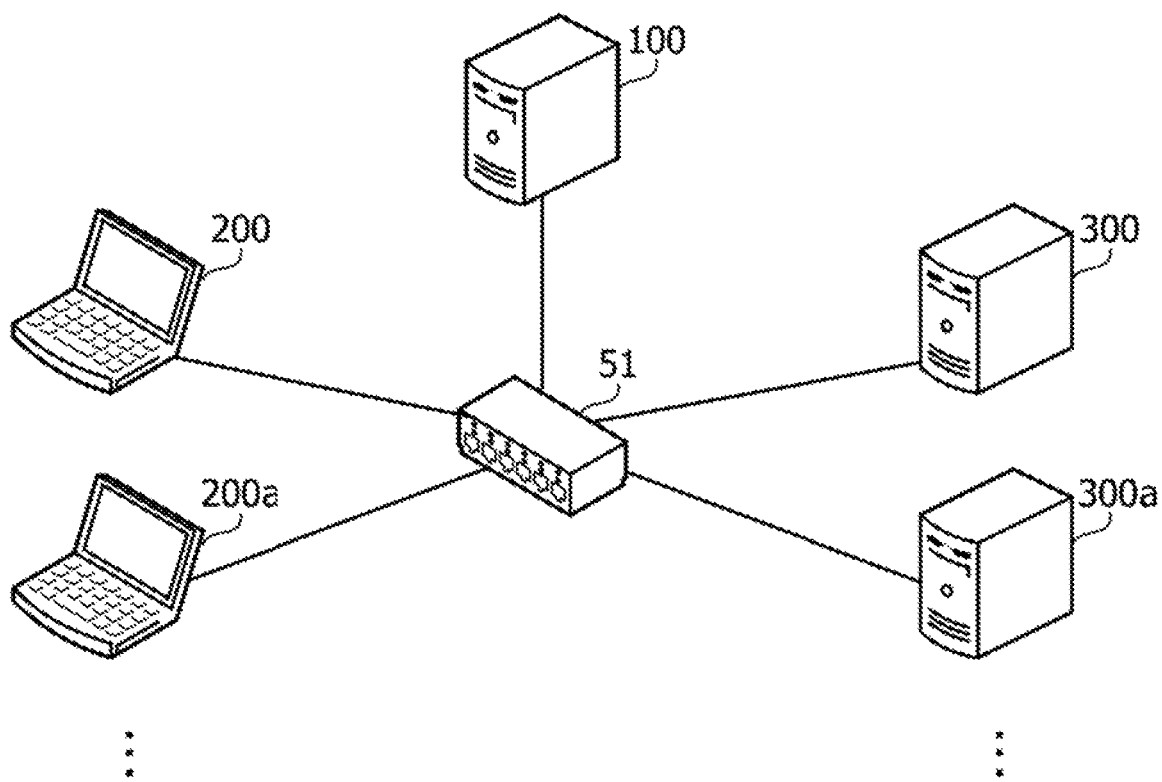
FIG. 2 is a diagram illustrating an example of an information processing system according to a second embodiment.

FIG. 2 is a diagram illustrating an example of an information processing system according to the second embodiment.

The Information processing system according to the second embodiment includes a monitoring device 100, client devices 200, 200a, . . . , and servers 300, 300a, . . . . The monitoring device 100, the client devices 200, 200a, . . . , and the servers 300, 300a, . . . are coupled to a switch 51. As a communication protocol for the information processing system according to the second embodiment, TCP/IP is used.

The switch 51 is a relay device that relays packets transmitted and to be received between the client devices 200, 200a, . . . and the servers 300, 300a, . . . . The switch 51 executes mirroring on the packet. For example, the switch 51 copies the packets transmitted and to be received between the client devices 200, 200a, . . . and the servers 300, 300a, . . . and transmits the copied packets to the monitoring device 100.

The monitoring device 100 is a server computer that monitors communication between the client devices 200, 200a, . . . and the servers 300, 300a, . . . and analyzes the quality of the communication between the client devices and the servers. The monitoring device 100 receives the packets, copied by the switch 51, between the client devices and the servers, thereby collecting the packets (packet capturing). The monitoring device 100 is an example of the packet analyzing device 10 according to the first embodiment.

The client devices 200, 200a, . . . are client computers that are operated by users. The users operate the client devices 200, 200a, . . . , to use various services provided by the servers 300, 300a, . . . . The client devices 200, 200a, . . . are an example of the nodes 20, 30, and 40 according to the first embodiment.

The servers 300, 300a, . . . are server computers that provide predetermined services. The servers 300, 300a, . . . communicate data on the services with the client devices 200, 200a, . . . in response to access from the client devices 200, 200a, . . . . The servers 300, 300a, . . . are an example of the nodes 20, 30, and 40 according to the first embodiment.

The communication between the client devices 200, 200a, . . . and the servers 300, 300a, . . . is distinguished in units of couplings. In the communication quality analysis by the monitoring device 100, experienced delay measurement is executed. The experienced delay measurement is a method of measuring a delay experienced by a user and is to measure, for each coupling, a time period from the start of access to a service to the end of the access to the service. The monitoring device 100 provides a function of reducing a load of an analysis process associated with the experienced delay measurement.

The monitoring device 100 measures indices (the number of lost packets, a round trip time (RTT), and throughput) indicating a network (NW) quality of the network (NW), as well as the experienced delay measurement.

Figure 3:
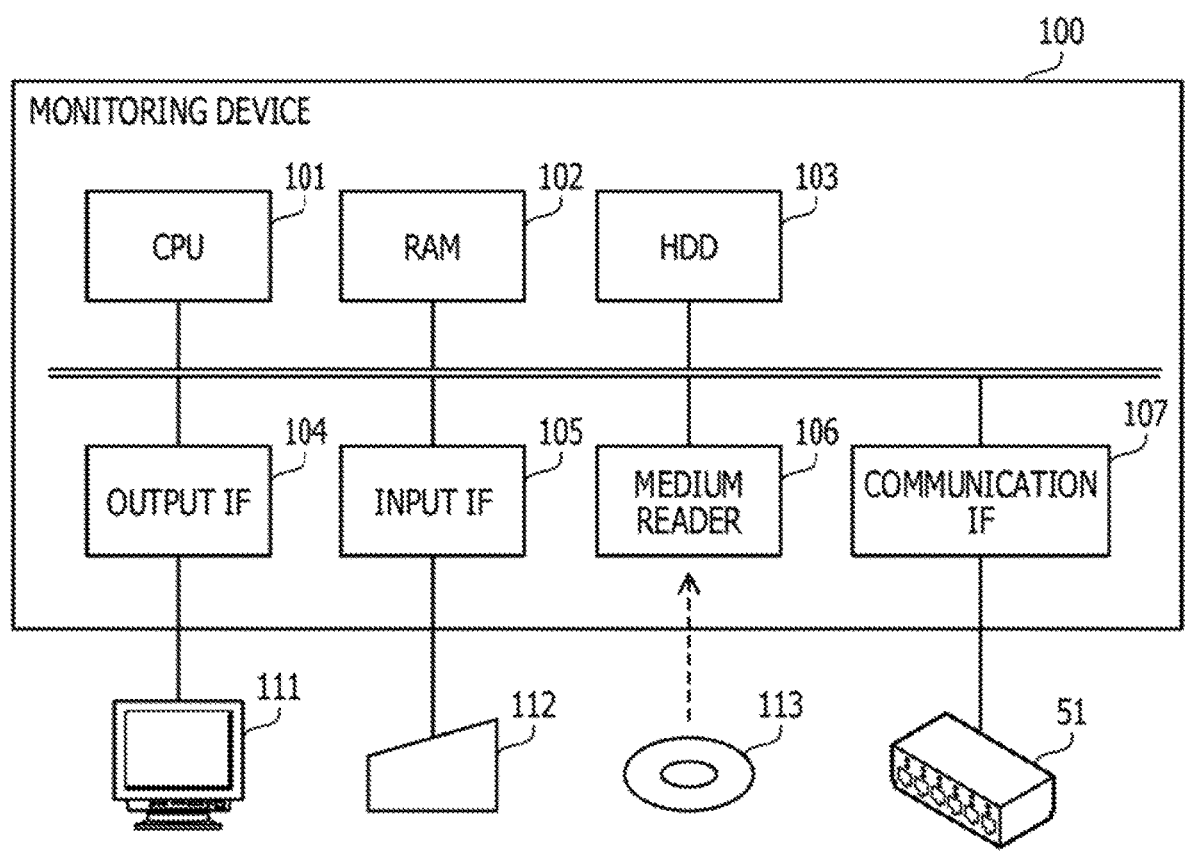
FIG. 3 is a block diagram illustrating a hardware example of a monitoring device.

FIG. 3 is a block diagram illustrating a hardware example of the monitoring device.

The monitoring device 100 includes a CPU 101, a RAM 102, an HDD 103, an output interface (IF) 104, an input IF 105, a medium reader 106, and a communication IF 107. The CPU 101 corresponds to the processing unit 12 according to the first embodiment. The RAM 102 or the HDD 103 corresponds to the storage unit 11 according to the first embodiment.

The CPU 101 is a processor that executes a program command. The CPU 101 loads a portion or all of a program stored in the HDD 103 and data stored in the HDD 103 into the RAM 102 and executes the program. The CPU 101 may include multiple processor cores. The monitoring device 100 may include multiple processors. Processes described later may be executed in parallel by the multiple processors or the multiple processor cores. A set of the multiple processors is referred to as a "multi-processor" or merely referred to as a "processor" in some cases.

The RAM 102 is a volatile semiconductor memory for temporarily storing the program to be executed by the CPU 101 and data to be used by the CPU 101 to execute computation. The monitoring device 100 may include a type of memory other than a RAM and may include multiple memories.

The HDD 103 is a nonvolatile storage device that stores software programs including an operating system (OS), middleware, application software, and the like and data. The monitoring device 100 may include other types of storage devices including a flash memory, a solid state drive (SSD), and the like and may include multiple non-volatile storage devices.

The output IF 104 outputs an image to a display 111 coupled to the monitoring device 100 in accordance with a command from the CPU 101. As the display 111, an arbitrary type of display, which is a cathode ray tube (CRT) display, a liquid crystal display (LCD), a plasma display, an organic electro-luminescence (OEL) display, or the like, may be used.

The input IF 105 acquires an input signal from an input device 112 coupled to the monitoring device 100 and outputs the input signal to the CPU 101. As the input device 112, a pointing device, which is a mouse, a touch panel, a touch pad, a trackball, or the like, a keyboard, a remote controller, a button switch, or the like may be used. Multiple types of input devices may be coupled to the monitoring device 100.

The medium reader 106 is a reading device that reads a program stored in a storage medium 113 and data stored in the storage medium 113. As the storage medium 113, for example, a magnetic disk, an optical disc, a magneto-optical (MO) disk, a semiconductor memory, or the like may be used. The magnetic disk may be a flexible disk (FD), an HDD, or the like. The optical disc may be a compact disc (CD), a digital versatile disc (DVD), or the like.

For example, the medium reader 106 copies the program read from the storage medium 113 and the data read from the storage medium 113 into another storage medium that is the RAM 102, the HDD 103, or the like. For example, the read program is executed by the CPU 101. The storage medium 113 may be a portable storage medium and is used to distribute the program and the data in some cases. The storage medium 113 and the HDD 103 are referred to as computer-readable storage media in some cases.

The communication IF 107 is an interface that is coupled to the switch 51 and communicates with another computer via the switch 51. For example, the communication IF 107 is coupled to the switch 51 and a cable.

The client devices 200, 200a, . . . and the servers 300, 300a, . . . are realized by the same hardware as the monitoring device 100.

The following description focuses mainly on the client device 200 and the server 300, but also applies to the client devices 200a, . . . and the servers 300a.

Figure 4:
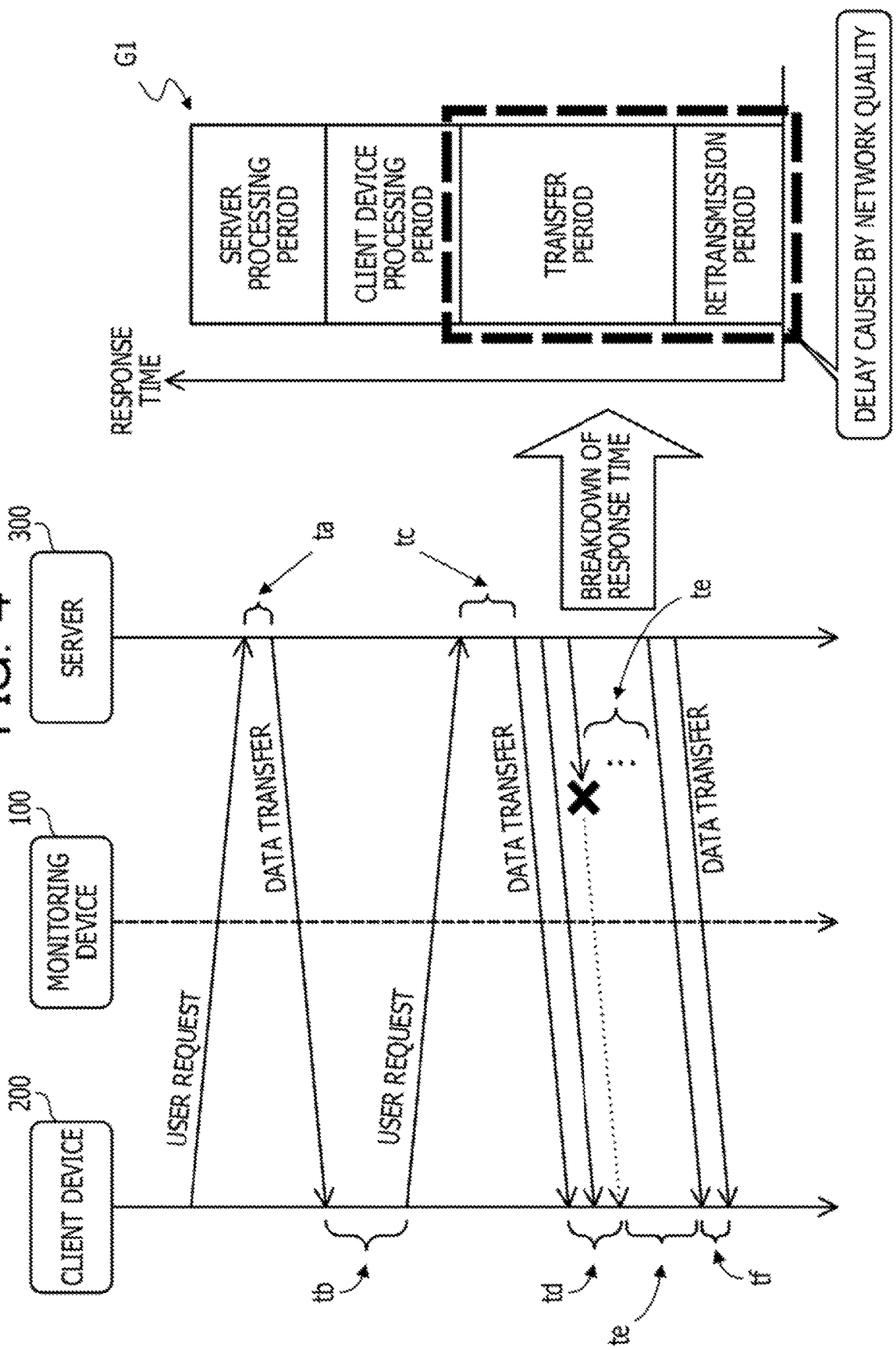
FIG. 4 is a diagram illustrating an example of a breakdown of a service response time.

FIG. 4 is a diagram illustrating an example of a breakdown of a service response time.

A service response time related to service access from the client device 200 to the server 300 includes server processing periods ta and tc, a client device processing period tb, transfer periods td and tf, and a retransmission period te.

The server processing periods ta and tc are time periods for processing executed in the server 300 in response to user requests from the client device 200. The server processing periods ta and tc are time periods from the reception of the user requests by the server 300 from the client device 200 to the start of transfer of data from the server 300 to the client device 200.

The client device processing period tb is a time period for processing executed in the client device 200 on the data from the server 300. The client device processing period tb is a time period from the reception of the data by the client device 200 from the server 300 to the start of the transmission of the next user request from the client device 200 to the server 300.

The transfer periods td and tf are time periods for transfer of data from the server 300 to the client device 200. In the experienced delay measurement, as a transfer period, not only a time period for data transfer from the server 300 to the client device 200 but also a time period for data transfer from the client device 200 to the server 300 may be aggregated. The transfer period does not include a time period (retransmission period) for data retransmission executed when the data transfer fails.

The retransmission period te is a time period for retransmission of data from the server 300 to the client device 200. In the experienced delay measurement, as a retransmission period, not only a time period for data retransmission from the server 300 to the client device 200 but also a time period for data retransmission from the client device 200 to the server 300 may be aggregated.

A graph G1 exemplifies a breakdown of the service response time. An ordinate of the graph G1 indicates the response time. An abscissa of the graph G1 indicates a combination of the client device 200 and the server 300. The service response time is the sum of a server processing period, a client device processing period, a transfer period, and a retransmission period, which have been measured between the client device 200 and the server 300. Among them, the transfer period and the retransmission period are delays caused by the NW quality. In the experienced delay measurement, a delay caused by the NW quality and a delay caused by server processing and client device processing may be distinguished from each other and measured.

Figure 5:
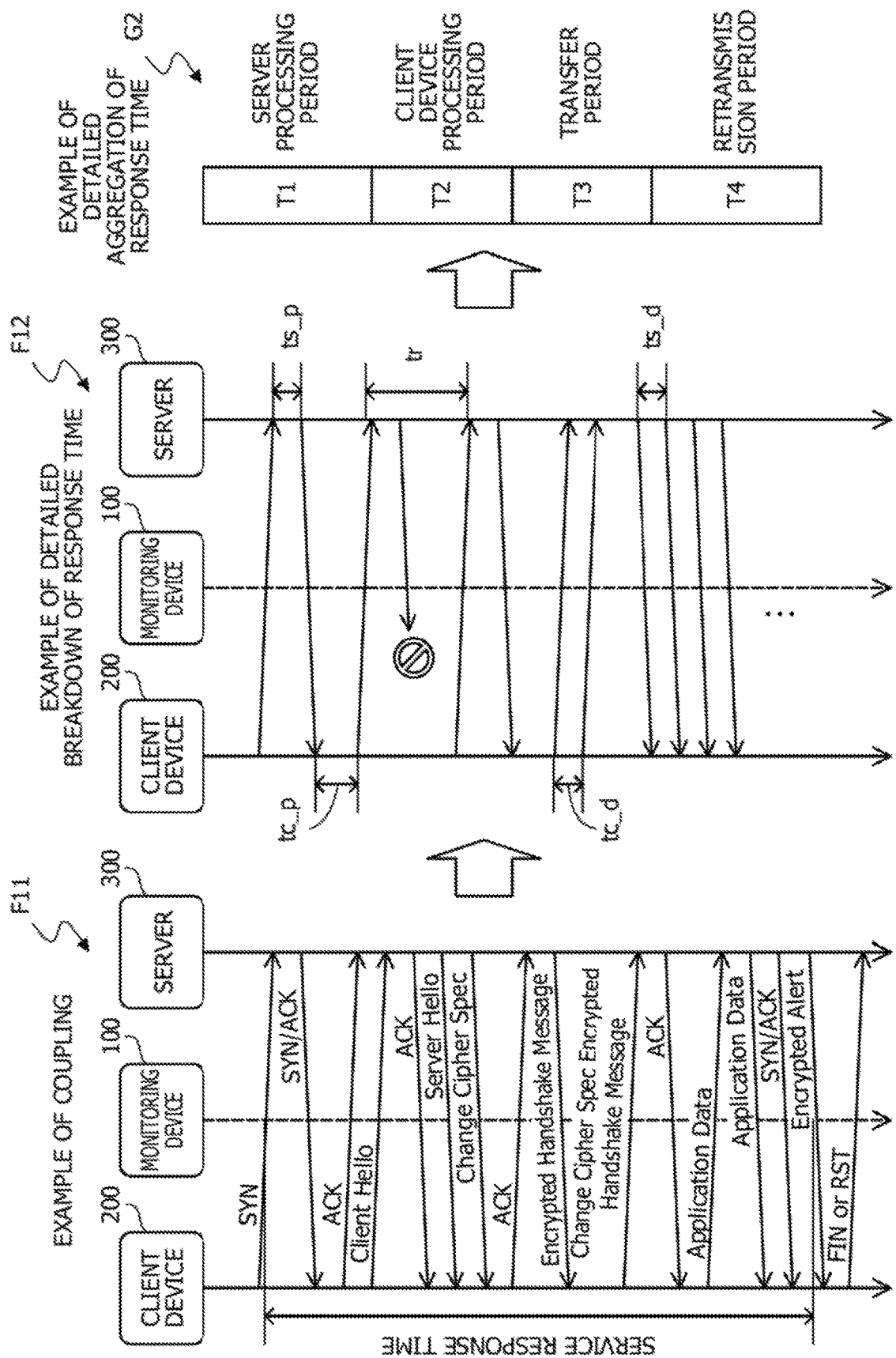
FIG. 5 is a diagram illustrating an example of the aggregation of a service response time.

FIG. 5 is a diagram illustrating an example of the aggregation of the service response time.

The monitoring device 100 acquires copies of packets transmitted and received by the client device 200 and the server 300 and analyzes the packets, thereby measuring the server processing period, the client device processing period, the transfer period, and the retransmission period.

A sequence F11 indicates an example of a coupling between the client device 200 and the server 300. The coupling is started based on a SYN packet from the client device 200 to the server 300 and terminated based on a FIN packet from the client device 200 to the server 300 or an RST packet from the client device 200 to the server 300. In this case, the service response time is, for example, the difference between the time when the SYN packet is detected by the monitoring device 100 and the time when a previous packet of the FIN packet or a previous packet of the RST packet is detected by the monitoring device 100.

A sequence F12 indicates an example of a detailed breakdown of a response time observed by the monitoring device 100 for the sequence F11.

The monitoring device 100 measures a server processing period ts_p from the difference between the time when a packet transmitted from the client device 200 to the server 300 is acquired by the monitoring device 100 and the time when a packet transmitted from the server 300 to the client device 200 after the packet transmitted from the client device 200 is acquired by the monitoring device 100.

The monitoring device 100 measures a client device processing period tc_p from the difference between the time when the packet transmitted from the server 300 to the client device 200 is acquired by the monitoring device 100 and the time when a packet transmitted from the client device 200 to the server 300 after the packet transmitted from the server 300 is acquired by the monitoring device 100.

The monitoring device 100 measures a data transmission interval ts_d of the server 300 from the difference (transmission interval) between times when multiple packets continuously transmitted from the servers 300 to the client device 200 are acquired by the monitoring device 100.

The monitoring device 100 measures a data transfer period tc_d of the client device 200 from the difference (transmission interval) between times when multiple packets continuously transmitted from the client device 200 to the server 300 are acquired by the monitoring device 100.

The monitoring device 100 calculates a retransmission period tr from the difference between the time when a packet (packet for which an acknowledgement has not been appropriately received by the client device 200 from the server 300) for retransmission from the client device 200 to the server 300 is acquired by the monitoring device 100 and the time when a packet actually retransmitted ongoing coupling list L1 is acquired by the monitoring device 100. The monitoring device 100 calculates a retransmission period tr for retransmission from the server 300 to the client device 200 in the same manner.

A graph G2 indicates an example of detailed aggregation, executed by the monitoring device 100, of the response time for the combination of the client device 200 and the server 300. The detailed aggregation of the response time indicates a result of measuring the service response time by the monitoring device 100 for the combination of the client device 200 and the server 300. The service response time includes a server processing period T1, a client device processing period T2, a transfer period T3, and a retransmission period T4.

The server processing period T1 is the sum of the server processing periods ts_p measured by the monitoring device 100 for the concerned coupling. The client device processing period T2 is the sum of the client device processing periods tc_p measured by the monitoring device 100 for the concerned coupling. The transfer period T3 is the sum of the data transfer periods tc_d and ts_d measured by the monitoring device 100 for the concerned coupling. The retransmission period T4 is the sum of the retransmission periods tr measured by the monitoring device 100 for the concerned coupling.

Figure 6A:
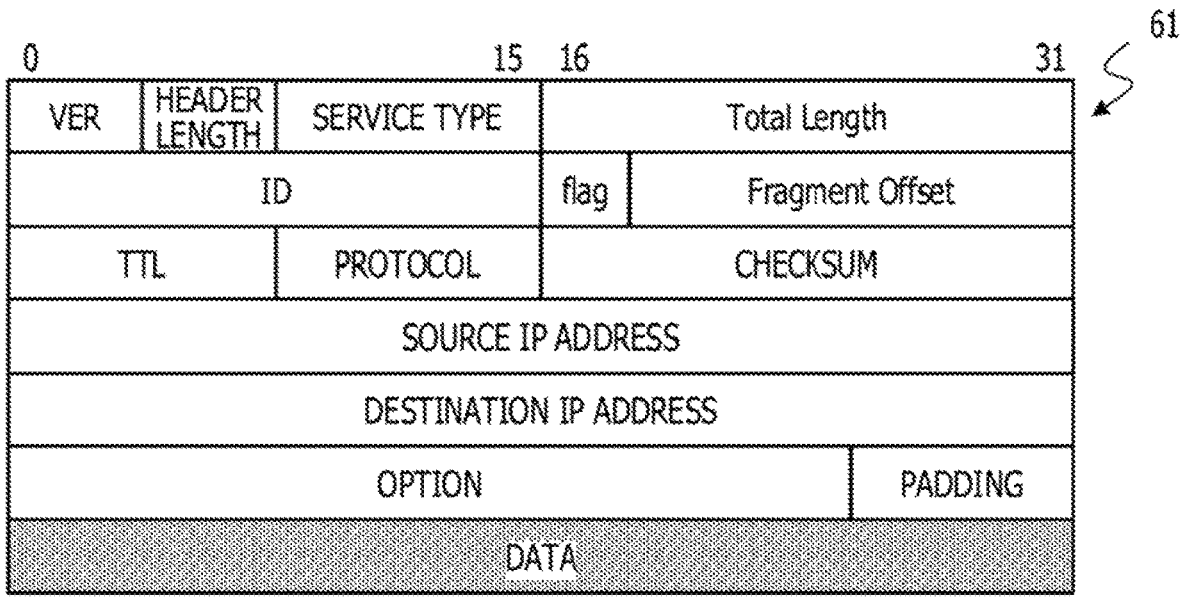
FIG. 6A is a diagram illustrating example of an IP header of packets.
Figure 6B:
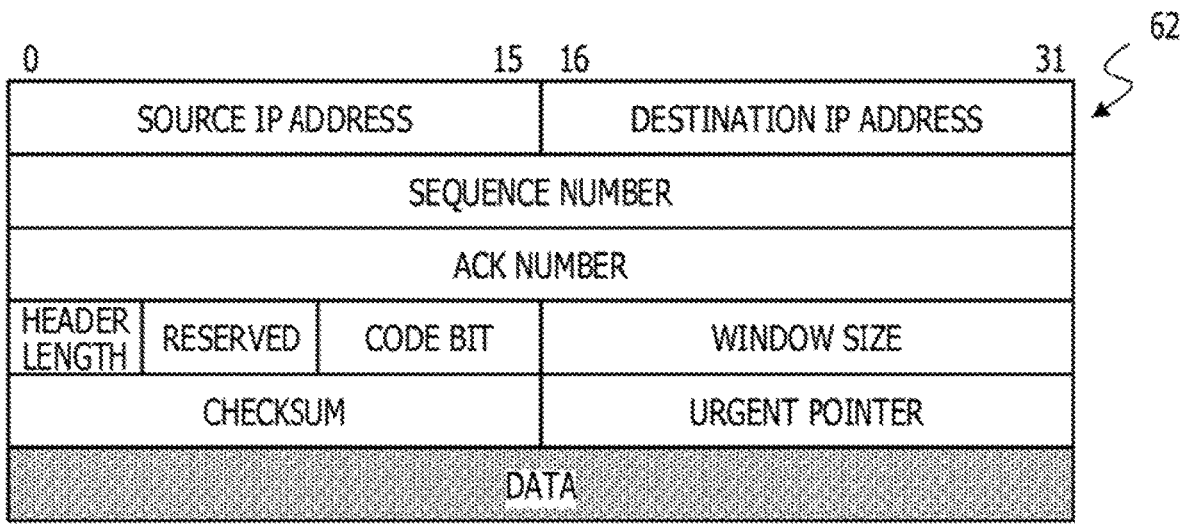
FIG. 6B is a diagram illustrating example of a TCP header of packets.
Figure 6C:
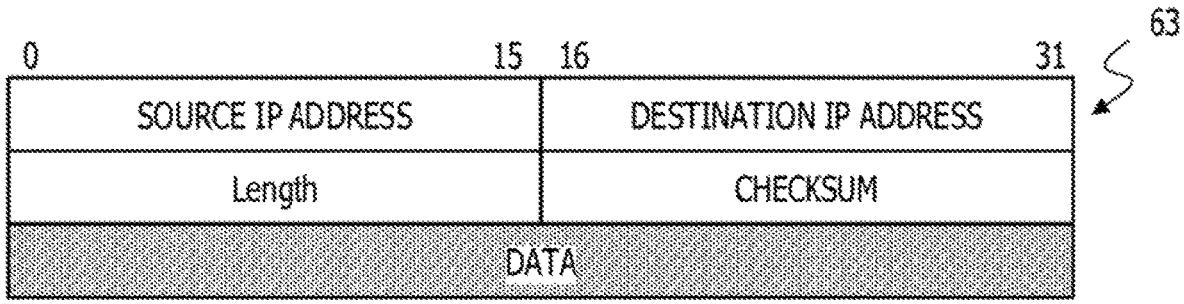
FIG. 6C is a diagram illustrating example of a UDP header of packets.

FIGS. 6A, 68, and 6C are diagrams illustrating examples of headers of packets.

FIG. 6A exemplifies an IP header 61 (header of IP version 4 (IPv4). FIG. 68 exemplifies a TCP header 62. FIG. 6C exemplifies a User Datagram Protocol (UDP) header 63.

The IP header 61 includes fields for a protocol, a source IP address, and a destination IP address. The protocol is information (8 bits) of a protocol number identifying an upper layer protocol (TCP, UDP, or the like). The source IP address is an IP address of a source device of the packet. The destination IP address is an IP address of a destination device of the packet. A "data" region corresponds to a data region to be processed according to the upper layer protocol and is referred to as a payload.

The TCP header 62 includes fields for a source port number and a destination port number. The source port number is information corresponding to an application program that has processed the packet in the source device of the packet. The destination port number is information corresponding to an application program that will process the packet in the destination device of the packet.

The UDP header 63 includes fields for a source port number and a destination port number. Details of the source port number and the destination port number are the same as those of the source port number and the destination port number in the TCP header 62.

Couplings are distinguished based on combinations of devices establishing the couplings, IP addresses associated with applications, and port numbers. The establishment (start) and termination of a coupling according to TCP that is the coupling-type protocol may be identified based on a SYN packet and a FIN packet or an RST packet, as described above. A series of communication units (referred to as couplings for convenience) may be traced by packet analysis also according to UDP that is the non-coupling-type protocol. For example, after a UDP packet is transmitted from a certain source device with a source port number to a destination device with a destination port number, a UDP packet may be continuously transmitted from the same source device with the source port number to the same destination device with the destination port number within a defined time period. In this case, it is considered that the monitoring device 100 classifies the multiple UDP packets continuously transmitted into the same coupling. The monitoring device 100, however, may use another method to identify the coupling according to UDP.

Figure 7:
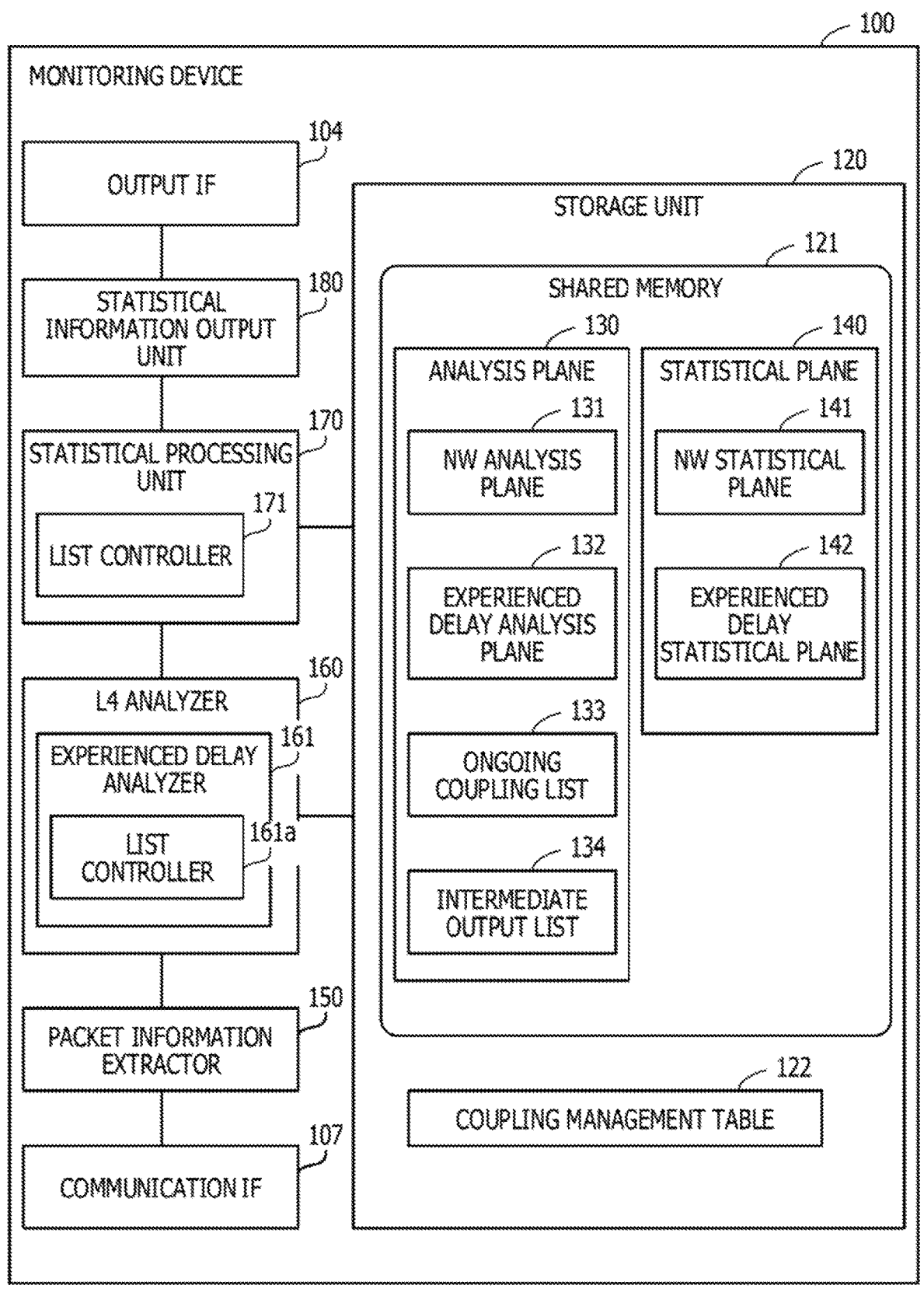
FIG. 7 is a block diagram illustrating an example of functions of the monitoring device.

FIG. 7 is a block diagram illustrating an example of functions of the monitoring device.

The monitoring device 100 includes a storage unit 120, a packet information extractor 150, a Layer 4 (L4) analyzer 160, a statistical processing unit 170, and a statistical information output unit 180. The storage unit 120 is realized using a storage region of the RAM 102 or a storage region of the HDD 103. The packet information extractor 150, the L4 analyzer 160, the statistical processing unit 170, and the statistical information output unit 180 are realized by causing the CPU 101 to execute a packet analysis program stored in the RAM 102. FIG. 7 also illustrates the output IF 104 and the communication IF 107 to clarify relationships between configurations.

The storage unit 120 stores data to be used for processes to be executed by the L4 analyzer 160 and the statistical processing unit 170. The storage unit 120 includes a shared memory 121 and a coupling management table 122.

The shared memory 121 is a predetermined storage region of the RAM 102. The shared memory 121 is able to be accessed by the L4 analyzer 160 and the statistical processing unit 170 in parallel at the same time. The shared memory 121 includes an analysis plane 130 and a statistical plane 140.

The analysis plane 130 holds, for each coupling, measurement information indicating a server processing period, a client device processing period, a transfer period, a retransmission period, and the like that have been measured based on captured packets.

The statistical plane 140 holds output information indicating measurement information to be used for a statistical process in each statistical cycle, and results of the statistical process. In the statistical process, measurement information of a server processing period, a client device processing period, a transfer period, and a retransmission period is aggregated for each coupling (for example, while the measured values of the measurement items are in an output format, the response time exemplified in FIG. 5 is calculated by summing the measured values of the measurement items, or the like). In the statistical process, the measurement information aggregated for each coupling is aggregated for multiple couplings in some cases. The statistical cycle is set in the monitoring device 100 in advance. For example, the statistical cycle is 60 seconds. The statistical cycle, however, may be shorter than 60 seconds or may be longer than 60 seconds. The "statistical process" related to the experienced delay measurement corresponds to the communication quality analysis according to the first embodiment.

The analysis plane 130 includes an NW analysis plane 131, an experienced delay analysis plane 132, an ongoing coupling list 133, and an intermediate output list 134.

The NW analysis plane 131 holds measurement information of the NW quality. The measurement information of the NW quality is information of the number of bytes of data transmitted and received, the number of packets, the number of lost packets, and an RTT.

The experienced delay analysis plane 132 holds measurement information of a server processing period, a client device processing period, a transfer period, and a retransmission period that are used for the experienced delay measurement.

The ongoing coupling list 133 holds information of currently ongoing (unterminated) couplings.

The intermediate output list 134 holds information (coupling information) of a coupling to be subjected to the statistical process at the time of the current statistical process among the ongoing couplings.

The statistical plane 140 includes an NW statistical plane 141 and an experienced delay statistical plane 142.

The NW statistical plane 141 holds measurement information related to the NW quality and to be used for the statistical process to be executed on the NW quality and output information indicating results of executing the statistical process on the NW quality. The output information of the NW quality is, for example, obtained by aggregating all couplings belonging to subnets and includes Information of the number of bytes, the number of packets, the number of packet losses, and an RTT for each of the subnets.

The experienced delay statistical plane 142 holds measurement information to be used for the experienced delay measurement and output information indicating results of the statistical process in the experienced delay measurement. The output information of the experienced delay measurement is, for example, information in an output format that is obtained by combining aggregated results of measurement items related to the experienced delay measurement for each coupling with coupling information (and may include the response time calculated from the sum of the measurement terms). Alternatively, as described above, when the aggregation is executed on multiple couplings in the statistical process, the output information of the experienced delay measurement may include information of server processing periods, client device processing periods, transfer periods, and retransmission periods that have been aggregated for the multiple couplings.

The coupling management table 122 is a table to be used to manage coupling information detected based on captured packets. The coupling management table 122 is updated by the L4 analyzer 160 and referenced by the statistical processing unit 170.

The packet information extractor 150 acquires a packet transmitted and received between a client device and a server via the communication IF 107. The packet information extractor 150 extracts information of an IP address, a port number, and the like that are included in the header 61 of the acquired packet, the TCP header 62 of the acquired packet, or the UDP header 63 of the acquired packet and generates packet information. The packet information includes a source IP address, a source port number, a destination IP address, a destination port number, and a protocol number that have been extracted from the packet. The packet information includes information of the acquisition time (timestamp), given by the packet information extractor 150, of the packet.

The L4 analyzer 160 registers, based on the packet information extracted by the packet information extractor 150, coupling information corresponding to the concerned packet in the coupling management table 122. The L4 analyzer 160 generates, based on the packet information, NW quality measurement information (the number of bytes, the number of packets, the number of lost packets, and the RTT that are described above) on the NW quality. The NW quality measurement information is stored in the NW analysis plane 131. The L4 analyzer 160 includes an experienced delay analyzer 161.

The experienced delay analyzer 161 generates, based on the packet information extracted by the packet information extractor 150, experienced delay measurement information (or a server processing period, a client device processing period, a transfer period, a retransmission periods, and the like, as described above) on the experienced delay measurement. The experienced delay measurement information is stored in the experienced delay analysis plane 132. The experienced delay analyzer 161 includes a list controller 161a. The list controller 161a updates the ongoing coupling list 133.

At each of times in a predetermined statistical cycle, the statistical processing unit 170 migrates the NW quality measurement information stored in the NW analysis plane 131 to the NW statistical plane 141 (or swaps the NW analysis plane 131 and the NW statistical plane 141) and executes the statistical process based on the NW quality measurement information. Then, the statistical processing unit 170 generates NW quality output information that is results of the statistical process based on the NW quality measurement information.

At each of the times in the statistical cycle, the statistical processing unit 170 migrates the experienced delay measurement information stored in the experienced delay analysis plane 132 to the experienced delay statistical plane 142 and executes the statistical process based on the experienced delay measurement information. Then, the statistical processing unit 170 generates experienced delay measurement output information that is results of the statistical process based on the experienced delay measurement information. The statistical processing unit 170 includes a list controller 171.

In the statistical process executed on the experienced delay measurement information, the statistical processing unit 170 normally treats, as targets to be processed, couplings that have been terminated in a time range from the previous statistical process to the current statistical process. For example, the statistical processing unit 170 normally removes, from targets to be subjected to the statistical process in the experienced delay measurement, an ongoing coupling at the time of the current statistical process. The statistical processing unit 170, however, treats, as a target to be processed, a coupling registered in the intermediate output list 134 even when the coupling is being established at the time of the current statistical process.

The list controller 171 updates the ongoing coupling list 133 and the intermediate output list 134 in each statistical cycle. Since the list controller 171 adds, to the intermediate output list 134, information of a coupling remaining in the ongoing coupling list 133 even when the statistical cycle has elapsed the predetermined number N of times or more after the addition of information of the coupling to the ongoing coupling list 133, the list controller 171 treats the coupling as a target to be subjected to the statistical process. The predetermined number N of times is an integer of 1 or greater and is set by a system administrator in advance.

The statistical processing unit 170 executes the statistical process of the NW quality, regardless of whether a concerned coupling has been terminated at the time of the current statistical process. This is due to the fact that, since it is sufficient if the NW quality between a network path or between the client devices and the servers is known in the statistical process of the NW quality, the aggregation for each coupling is not to be considered (for example, this is due to the fact that it is sufficient if statistical results aggregated per unit time are known).

In the statistical process by the statistical processing unit 170, at each time of the statistical process, the NW quality measurement information and the experienced delay measurement information that have been written by the L4 analyzer 160 to the analysis plane 130 are read into the statistical plane 140 and output in an output format with coupling information and the like. The statistical processing unit 170, however, may further execute the following process.

First, the statistical processing unit 170 may compress the output information. For example, when analysis results (statistical process results) are output for each coupling, the output amount may be too large and thus the statistical processing unit 170 collectively outputs output information of multiple couplings at one time within a target time period in the statistical process. For example, it is considered that the statistical processing unit 170 collectively handles couplings (with the same source IP address, the same destination IP address, the same protocol number, and the same destination port) that differ only in source ports (this is due to the fact that, when the same service is accessed multiple times, only source ports are different in many cases).

The statistical processing unit 170 may calculate and output, as experienced delay measurement output information, the total value, the maximum value, the average value, or the like (that is able to be changed by setting) of each of measurement items between multiple couplings. The statistical processing unit 170 may output, as the NW quality output information, the total value of the numbers of bytes transmitted and received between a concerned client device and a concerned server, the total value of the numbers of packets between the concerned client device and the concerned server, the total value of the numbers of lost packets between the concerned client device and the concerned server, an average value of the RTT between the concerned client device and the concerned server, and the like.

Secondly, the statistical processing unit 170 may aggregate the NW quality measurement information in units other than couplings. For example, the statistical processing unit 170 may aggregate and output, for each subnet, all of the number of bytes transmitted and received, the number of packets, the number of lost packets, and the RTT that are related to a coupling belonging to the subnet.

The statistical information output unit 180 outputs the NW quality output information generated by the statistical processing unit 170 and the experienced delay measurement output information generated by the statistical processing unit 170 to the display 111 via the output IF 104 and causes the display 111 to display results of analyzing the NW quality and analysis results of the experienced delay measurement. The statistical information output unit 180 may output the NW quality output information and the experienced delay measurement output information to another computer, an external storage device, and the like via the communication IF 107.

Next, a data structure example of data to be used for the experienced delay measurement by the monitoring device 100 is described.

FIG. 8 is a diagram illustrating an example of the coupling management table.

The coupling management table 122 includes items for a coupling identifier (ID), a source IP address, a destination IP address, a protocol number, a source port number, a destination port number, and an experienced delay measurement information pointer.

In the coupling ID item, a coupling ID that is identification information of a coupling is registered. In the source IP address item, an IP address of a client device that is source of access to a service is registered (however, packets of the concerned coupling include a packet in which the concerned IP address is a destination IP address). In the destination IP address item, an IP address of a server that is a destination of the access to the service is registered (however, the packets of the concerned coupling include a packet in which the concerned IP address is a source IP address). In the protocol number item, the protocol number of the IP header 61 is registered. For example, a protocol number "6" indicates TCP. A protocol number "17" indicates UDP. In the source port number item, a port number of the client device that is the source of the access to the service is registered (however, the packets of the concerned coupling include a packet in which the concerned port number is a destination port number). In the destination port number item, a port number of the server that is the destination of the access to the service is registered (however, the packets of the concerned coupling include a packet in which the concerned port number is a source port number). In the experienced delay measurement information pointer item, a pointer indicating a storage destination address of experienced delay measurement information between the concerned client device and the concerned server is registered.

For example, in the coupling management table 122, a record is registered, which indicates that a coupling ID is "CON1", a source IP address is "10.20.30.40", a destination IP address is "10.20.30.50", a protocol number is "6", source port number is "2000", a destination port number is "20", and an experienced delay measurement information pointer is "*P1". In the coupling management table 122, information of other couplings (coupling with a coupling ID of "CON2", coupling with a coupling ID of "CON3", and the like) is registered.

Figure 9:
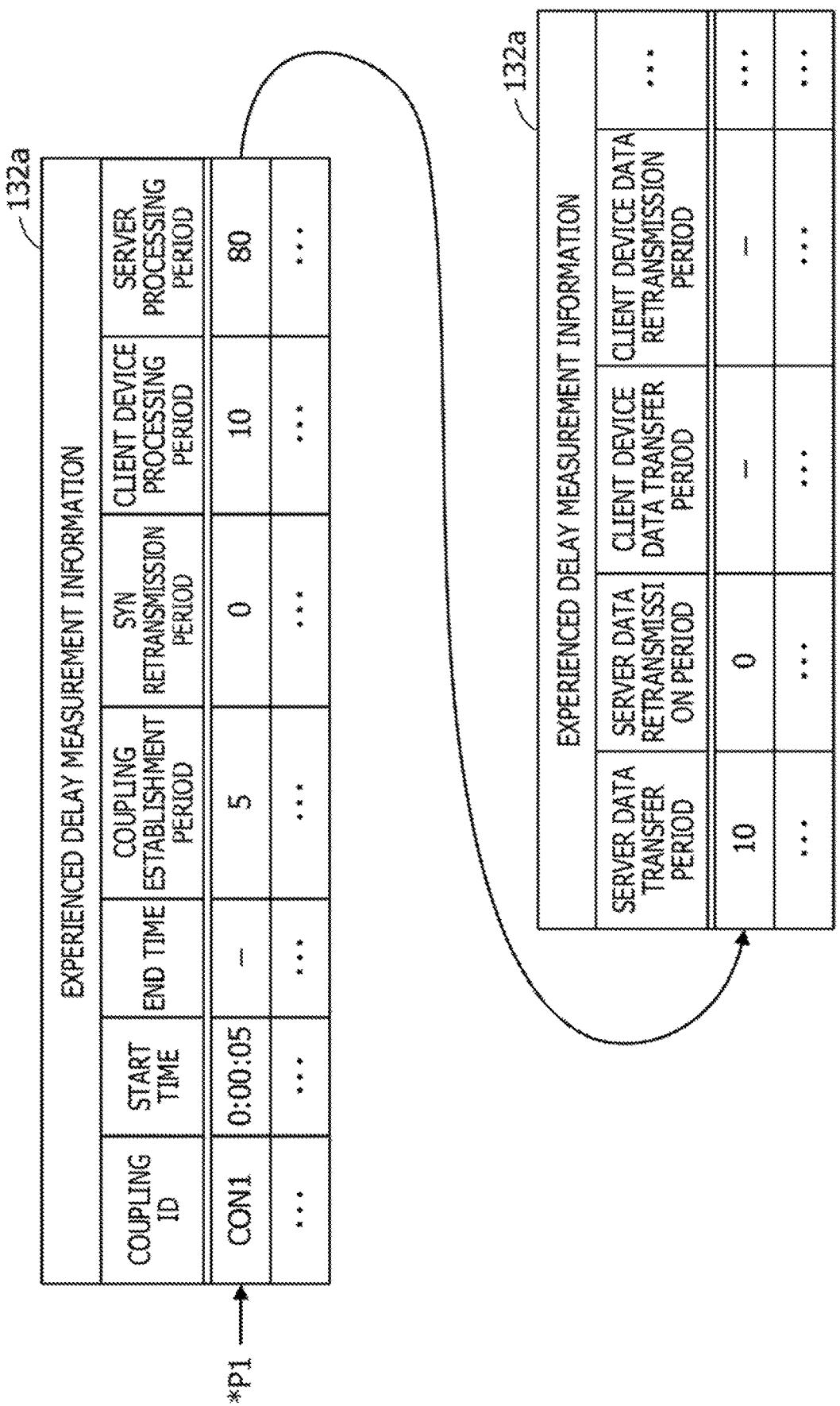
FIG. 9 is a diagram illustrating an example of experienced delay measurement information.

FIG. 9 is a diagram illustrating an example of the experienced delay measurement information.

Experienced delay measurement information 132*a* is stored in the experienced delay analysis plane 132. The experienced delay measurement information 132*a* includes items for a coupling ID, a start time, an end time, a coupling establishment period, a SYN retransmission period, a client device processing period, a server processing period, a server data transfer period, a server data retransmission period, a client device data transfer period, and a client device data retransmission period. The experienced delay measurement information 132*a* may include other items for an idling period (idle periods) Indicating a standby period for waiting for a user operation in a client device and the like.

In the coupling ID item, a coupling ID of a coupling is registered. In the start time item, a start time of the coupling is registered. In the end time item, an end time of the coupling is registered. In the coupling establishment period item, a time period for the establishment of the coupling is registered. A unit of time is micro seconds (μs) (the same applies to the other items). In the SYN retransmission period item, a time period for retransmission (SYN retransmission) of a SYN packet is registered. In the client device processing period item, a time period for processing by the client device is registered. In the server processing period item, a time period for processing by the server is registered. In the server data transfer period item, a time period for data transfer by the server is registered. In the server data retransmission period item, a time period for data retransmission by the server is registered. In the client device data transfer period item, a time period for data transfer by the client device is registered. In the client device data retransmission period item, a time period for data retransmission by the client device is registered.

For example, in the experienced delay measurement information 132a, a record is registered, which indicates that a coupling ID is "CON1", a start time is "0:00:05", an end time is "-" ("-" (hyphen) indicates no setting), a coupling establishment period is "5" (μs), a SYN retransmission period is "0" (μs), a client device processing period is "10" (μs), a server processing period is "80" (μs), a server data transfer period is "10" (μs), a server data retransmission period is "0" (μs), a client device data transfer period is "-" (Indicating that data is not transferred from the client device), and a client device data retransmission period is "-" (indicating that data is not retransmitted from the client device). The end time "-" indicates that the concerned coupling is not yet terminated.

In the experienced delay measurement information 132a, records related to other couplings are registered.

The records included in the experienced delay measurement information 132a and corresponding to the couplings are identified by pointers indicating top addresses of the records. For example, a top address of a record "P1" corresponding to the coupling ID "CON" or a pointer indicating the top address is represented by "*P1".

FIG. 10 is a diagram illustrating an example of the experienced delay measurement output information. Experienced delay measurement output information 142a is stored in the experienced delay statistical plane 142. The experienced delay measurement output information 142a includes items for an output time, a source IP address, a destination IP address, a protocol number, a source port number, a destination port number, a start time, an end time, a coupling establishment period, a SYN retransmission period, a client device processing period, a server processing period, a server data transfer period, a server data retransmission period, a client device data transfer period, and a client device data retransmission period. The experienced delay measurement output information 142a may include other items for an idling period indicating a standby period for waiting for a user operation in a client device and the like.

In the output time item, the time when a concerned record is output is registered. In the source IP address, an IP address of a client device that is a source of access to a service is registered. In the destination IP address, an IP address of a server that is a destination of the access to the service is registered. In the protocol number item, a protocol number is registered. In the source port number item, a port number of the client device that is the source of the access to the service is registered. In the destination port number item, a port number of the server that is the destination of the access to the service is registered. In the start time item, a start time of a coupling is registered. In the end time item, an end time of the coupling is registered. In the coupling establishment period item, a time period for the establishment of the coupling is registered. A unit of time is micro seconds (μs) (the same applies to the other items). In the SYN retransmission period item, a time period for SYN retransmission is registered. In the client device processing period item, a time period for processing by the client device is registered. In the server processing period item, a time period for processing by the server is registered. In the server data transfer period item, a time period for data transfer by the server is registered. In the server data retransmission period item, a time period for data retransmission by the server is registered. In the client device data transfer period item, a time period for data transfer by the client device is registered. In the client device data retransmission period item, a time period for data retransmission by the client device is registered.

For example, in the experienced delay measurement output information 142a, a record is registered, which indicates that an output time is "0:01:00", a source IP address is "10.20.30.40", a destination IP address is "10.20.30.50", a protocol number is "6", a source port number is "2000", a destination port number is "20", a start time is "0:00:05", an end time is "-", a coupling establishment period is "5" (μs), a SYN retransmission period is "0" (μs), a client device processing period is "60" (μs), a server processing period is "80" (μs), a server data transfer period is "10" (μs), a server data retransmission period is "0" (μs), a client device data transfer period is "10" (μs), and a client device data retransmission period is "0" (μs).

In the experienced delay measurement output information 142a, records related to other couplings are registered.

Figure 11:
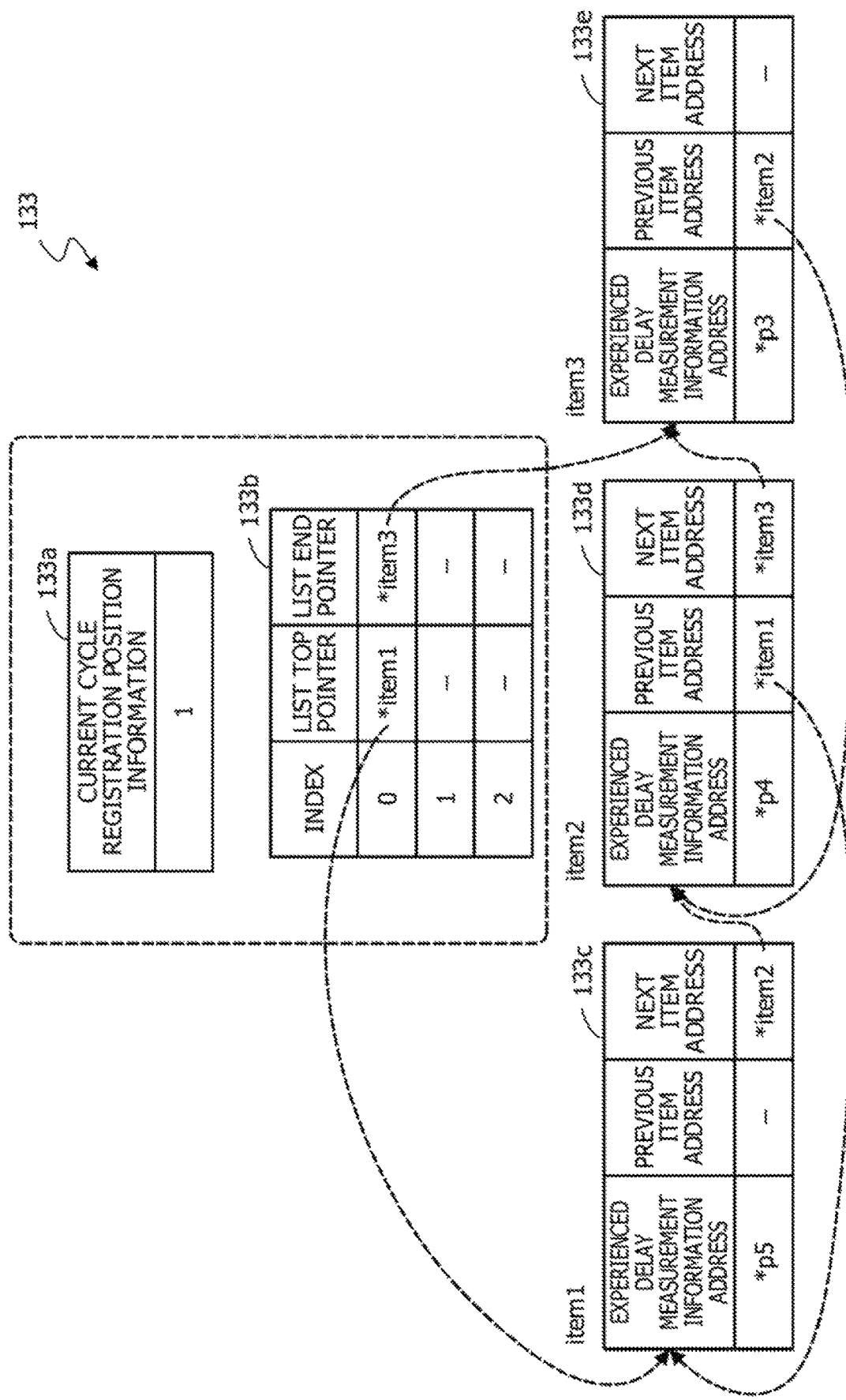
FIG. 11 is a diagram illustrating an example of an ongoing coupling list.

FIG. 11 is a diagram illustrating an example of the ongoing coupling list.

The ongoing coupling list 133 includes current cycle registration position information 133a, index management data 133b, and list elements 133c, 133d, and 133e.

The current cycle registration position information 133a is an index indicating the position of a sublist associated with a time range of the current statistical cycle. The ongoing coupling list 133 includes sublists associated with time ranges of statistical cycles. The sublists are information obtained by treating information of couplings in the time ranges as list elements and coupling the list elements by pointers.

The index management data 133b holds indices, list top pointers, and list end pointers. Each of the list top pointers is a pointer indicating a list element at the top of a sublist associated with a concerned index. Each of the list end pointers is a pointer indicating a list element at the end of a sublist associated with a concerned index.

For example, in the index management data 133b, indices "0", "1", and "2" are registered in advance. The number of indices in the index management data 133b is determined in advance and is larger than the foregoing predetermined number N of times. For example, the number of indices is N+1. In this case, when N=2, the number of indices is 3. In the index management data 133b, a list top pointer and a list end pointer are registered for each of the indices. When a list element belonging to a sublist of a concerned index does not exist, a list top pointer and a list end pointer indicate no setting (indicated by "-" (hyphen)). In an example of the index management data 133b, list elements associated with the indices "1" and "2" do not exist.

The list elements 133c, 133d, and 133e belong to a sublist of the index "0". Although FIG. 11 exemplifies the case where the 3 list elements exist for the index "0", a list element may not exist for the index "0", or 1, 2, 4, or more list elements may exist for the index "0".

Each of the list elements 133c, 133d, and 133e holds an experienced delay measurement information address, a previous item address, and a next item address. The experienced delay measurement information address is a pointer indicating experienced delay measurement information acquired for an ongoing coupling. The previous item address is a pointer indicating a list element coupled immediately before a concerned list element. When the concerned list element is the top list element, the previous item address indicates no setting "-". The next item address is a pointer indicating a list element coupled immediately after the concerned list element. When the concerned list element is the last list element, the next item address indicates no setting "-".

For example, in the ongoing coupling list 133, the current cycle registration position information 133a indicates the index "1". For example, the current cycle registration position information 133a indicates that coupling information is added to a sublist of the index "1" in a time range of the current statistical cycle.

The list controller 171 repeatedly sets the index indicated in the current cycle registration position information 133a every time the statistical cycles elapses. For example, at a first time when the statistical process is started, the list controller 171 sets the current cycle registration position information 133a to the index "0". At a second time when the next statistical process is started after a time period corresponding to the statistical cycle elapses after the first time, the list controller 171 sets the current cycle registration position information 133a to the index "1". At a third time when the next statistical process is started after a time period corresponding to the statistical cycle elapses after the second time, the list controller 171 sets the current cycle registration position information 133a to the index "2". At a fourth time when the next statistical process is started after a time period corresponding to the statistical cycle elapses after the third time, the list controller 171 sets the current cycle registration position information 133a to the index "0". After that, every time the statistical cycle elapses, the list controller 171 changes the index of the current cycle registration position information 133a to "1", "2", "0", "1", . . . In the same manner while repeatedly setting the index. In this manner, the list controller 171 repeatedly sets the index of the current cycle registration position information 133a every time the statistical cycle elapses.

In an example of the index management data 133b, a list top pointer "*item1" and a list end pointer "*item3" are registered for the index "0". In this case, "item1" indicates the list element 133c. "item2" indicates the list element 133d. "item3" indicates the list element 133e. In this case, a list element indicated at the top and associated with the index "0" is the list element 133c. A list element indicated at the end and associated with the index "0" is the list element 133e.

In the list element 133c, the experienced delay measurement information address is "*p5", the previous item address is "-", and the next item address is "*item2". Since "*item2" indicates the list element 133d, a list element coupled immediately after the list element 133c is the list element 133d.

In the list element 133d, the experienced delay measurement information address is "*p4", the previous item address is "*item1", and the next item address is "*item3".

Since "*item3" indicates the list element 133e, a list element coupled immediately after the list element 133d is the list element 133e.

In the list element 133e, the experienced delay measurement information address is "*p3", the previous item address is "*item2", and the next item address is "-".

Figure 12:
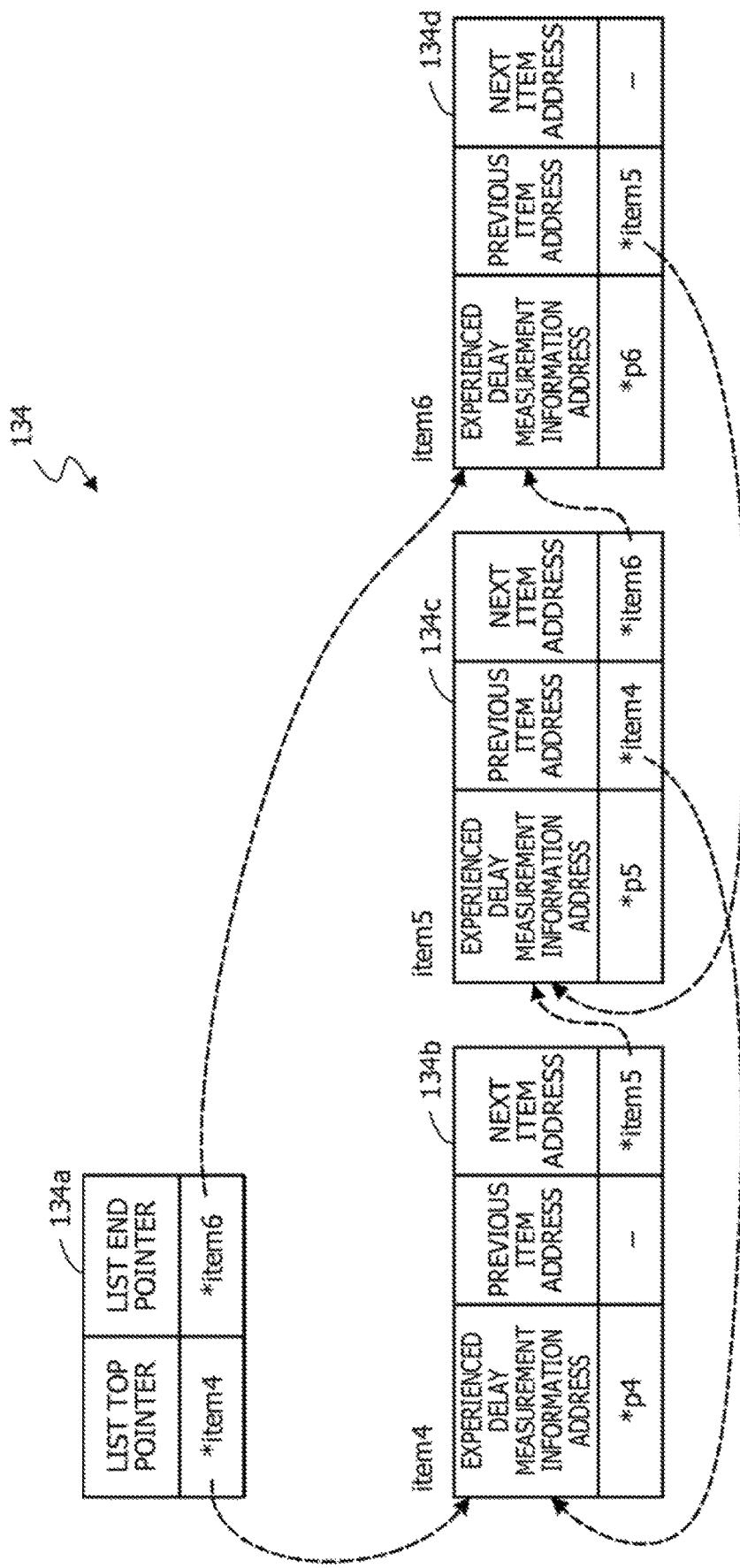
FIG. 12 is a diagram illustrating an example of an intermediate output list.

FIG. 12 is a diagram illustrating an example of the intermediate output list.

The intermediate output list 134 includes list management data 134a and list elements 134b, 134c, and 134d.

The list management data 134a holds a list top pointer and a list end pointer. The list top pointer is a pointer indicating a list element at the top of the intermediate output list 134. The list end pointer is a pointer indicating a list element at the end of the intermediate output list 134. In the intermediate output list 134, a list element may not exist. In this case, the list top pointer and the list end pointer indicate no setting "-".

The list elements 134b, 134c, and 134d belong to the intermediate output list 134. Although FIG. 12 exemplifies the case where the 3 list elements exist in the intermediate output list 134, a list element may not exist in the intermediate output list 134, or 1, 2, 4, or more list elements may exist in the intermediate output list 134.

Each of the list element 134b, 134c, and 134d holds an experienced delay measurement information address, a previous item address, and a next item address. Information set as the experienced delay measurement information address, the previous item addresses, and the next item addresses is the same as information set in the items having the same names as those of the items of the list elements 133c, 133d, and 133e exemplified in FIG. 11.

In an example of the list management data 134a, the list top pointer "*item4" and the list end pointer "*item6" are registered. In this case, "item4" indicates the list element 134b. "item5" indicates the list element 134c. "item6" indicates the list element 134d. In this case, a list element indicated at the top of the intermediate output list 134 is the list element 134b. A list element indicated at the end of the intermediate output list 134 is the list element 134d.

In the list element 134b, the experienced delay measurement information address is "*p4", the previous item address is"-", and the next item address is "*item5". Since "*item5" Indicates the list element 134c, a list element coupled immediately after the list element 134b is the list element 134c.

In the list element 134c, the experienced delay measurement information address is "*p5", the previous item address is "*item4", and the next item address is "*item6". Since "*item6" indicates the list element 134d, a list element coupled immediately after the list element 134c is the list element 134d.

In the list element 134d, the experienced delay measurement information address is "*p6", the previous item address is "*item5", and the next item address is "-".

Next, an example of the flow of a process by the monitoring device 100 using the foregoing ongoing coupling list 133 and the foregoing intermediate output list 134 is described.

Figure 13:
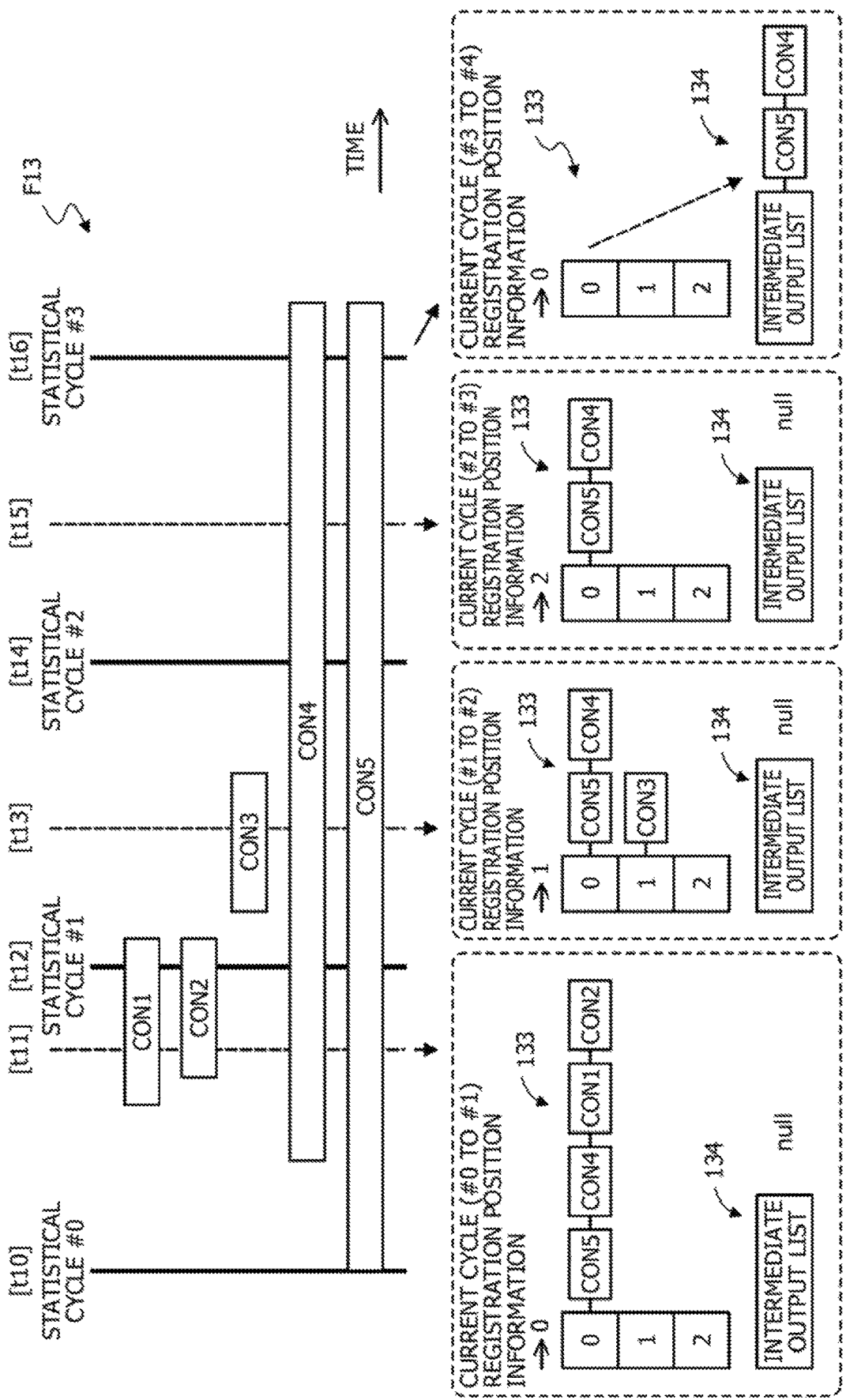
FIG. 13 is a diagram illustrating an example of the flow of experienced delay measurement by the monitoring device.

FIG. 13 is a diagram illustrating an example of the flow of the experienced delay measurement by the monitoring device.

A time chart F13 indicates an example of a coupling detected between a certain client device and a certain server. In the time chart F13, a direction from the left side to the right side is a positive direction of time. Times t10, t11, t12, t13, t14, t15, and t16 are times that come in this order in the time chart F13. Among them, the times t10, t12, t14, and t16 indicate times when the statistical process is started in statistical cycles. In FIG. 13, to easily clarify the start times of the statistical process, character strings, a "statistical cycle #0", a "statistical cycle #1", a "statistical cycle #2", and a "statistical cycle #3" are indicated for the times t10, t12, t14, and t16, respectively. A coupling with a coupling ID "CONx" is hereinafter referred to as "coupling CONx" in some cases. In FIG. 13, the foregoing predetermined number N of times is 2.

It is assumed that the current cycle registration position information 133a of the ongoing coupling list 133 is as follows. The current cycle registration position information 133a for a time period from the start time of the statistical cycle #0 to the start time of the statistical cycle #1 is the index "0". The current cycle registration position information 133a for a time period from the start time of the statistical cycle #1 to the start time of the statistical cycle #2 is the index "1". The current cycle registration position information 133a for a time period from the start time of the statistical cycle #2 to the start time of the statistical cycle #3 is the index "2". The current cycle registration position information 133a for a time period from the start time of the statistical cycle #3 to the start time of the statistical cycle #4 (an illustration of the statistical cycle #4 is omitted) is the index "0".

It is assumed that, immediately before the time t10 (statistical cycle #0), a list element is not registered in any of the ongoing coupling list 133 and the intermediate output list 134.

For example, the monitoring device 100 detects, based on captured packets, that couplings CON5, CON4, CON1, and CON2 have been started in this order in a time range between the time t10 and the time t12. The monitoring device 100 adds information (list elements) of the couplings CON5, CON4, CON1, and CON2 to the ongoing coupling list 133 in the order in which the couplings have been detected.

For example, at the time t11, the list elements (4 list elements), which indicate the couplings CON5, CON4, CON1, and CON2, respectively, are already registered for the index "0" of the ongoing coupling list 133. At the time t11, the intermediate output list 134 is "null". "null" indicates that a list element is not registered in the intermediate output list 134.

At the time t12 (statistical cycle #1), each of the couplings CON5, CON4, CON1, and CON2 is being established. However, since a list element does not exist for the index "1" indicated in the current cycle registration position information 133a, the monitoring device 100 does not start the statistical process on any of the ongoing couplings at the time t12.

In a time interval between the times t12 and t13, the monitoring device 100 detects that the couplings CON1 and CON2 have been terminated and that the coupling CON3 has been newly started. The monitoring device 100 removes information of the couplings CON1 and CON2 from the ongoing coupling list 133 in the order in which the couplings have been detected, and adds information of the coupling CON3 to the ongoing coupling list 133. The information of the couplings CON1 and CON2 is removed from the sublist of the index "0" of the ongoing coupling list 133. The information of the coupling CON3 is added to the sublist of the index "1" of the ongoing coupling list 133.

For example, at the time t13, the list elements (2 list elements), which indicate the couplings CON5 and CON4, respectively, are already registered for the index "0" of the ongoing coupling list 133. At the time t13, a list element indicating the coupling CON3 is already registered for the index "1" of the ongoing coupling list 133. At the time t13, the intermediate output list 134 is "null".

In a time interval between the times t13 and t14, the monitoring device 100 detects that the coupling CON3 has been terminated. Then, the monitoring device 100 removes the information of the coupling CON3 from the ongoing coupling list 133.

In a time interval between the start time of the statistical cycle #1 and the start time of the statistical cycle #2, the couplings CON1, CON2, and CON3 are terminated. At the time t14 (statistical cycle #2), the couplings CON1, CON2, and CON3 are already terminated. Therefore, the monitoring device 100 executes the statistical process on the experienced delay measurement information for the couplings CON1, CON2, and CON3 and outputs the experienced delay measurement output information indicating results of the statistical process. Since a list element does not exist for the index "2" indicated in the current cycle registration position information 133a, the monitoring device 100 does not start the statistical process on any of the ongoing couplings at the time t14.

For example, at the time t15, the list elements (2 list elements), which indicate the couplings CON5 and CON4, respectively, are already registered for the index "0" of the ongoing coupling list 133. At the time t15, the intermediate output list 134 is "null".

At the time t16 (statistical cycle #3), the list elements indicating the ongoing couplings CON5 and CON4 exist for the index "0" indicated in the current cycle registration position information 133a. Therefore, the monitoring device 100 determines that the couplings CON5 and CON4 are continuously established for time periods in which the statistical cycle has continuously repeated the number N (=2) of times or more. The monitoring device 100 adds the list elements indicating the couplings CON5 and CON4 for the index "0" to the intermediate output list 134, thereby treating the couplings CON5 and CON4 as targets to be subjected to intermediate output in the experienced delay measurement. In this manner, the ongoing couplings CON5 and CON4 may be treated as targets to be subjected to the current statistical process.

In the migration of coupling information to the intermediate output list 134, the monitoring device 100 may leave the list elements of the couplings CON5 and CON4 in the ongoing coupling list 133 or remove the list elements from the ongoing coupling list 133. When the list elements of the couplings CON5 and CON4 remain in the ongoing coupling list 133, the experienced delay measurement is continuously executed on the couplings CON5 and CON4 after the time t16.

Next, a process procedure related to the experienced delay measurement by the monitoring device 100 is described.

Figure 14:
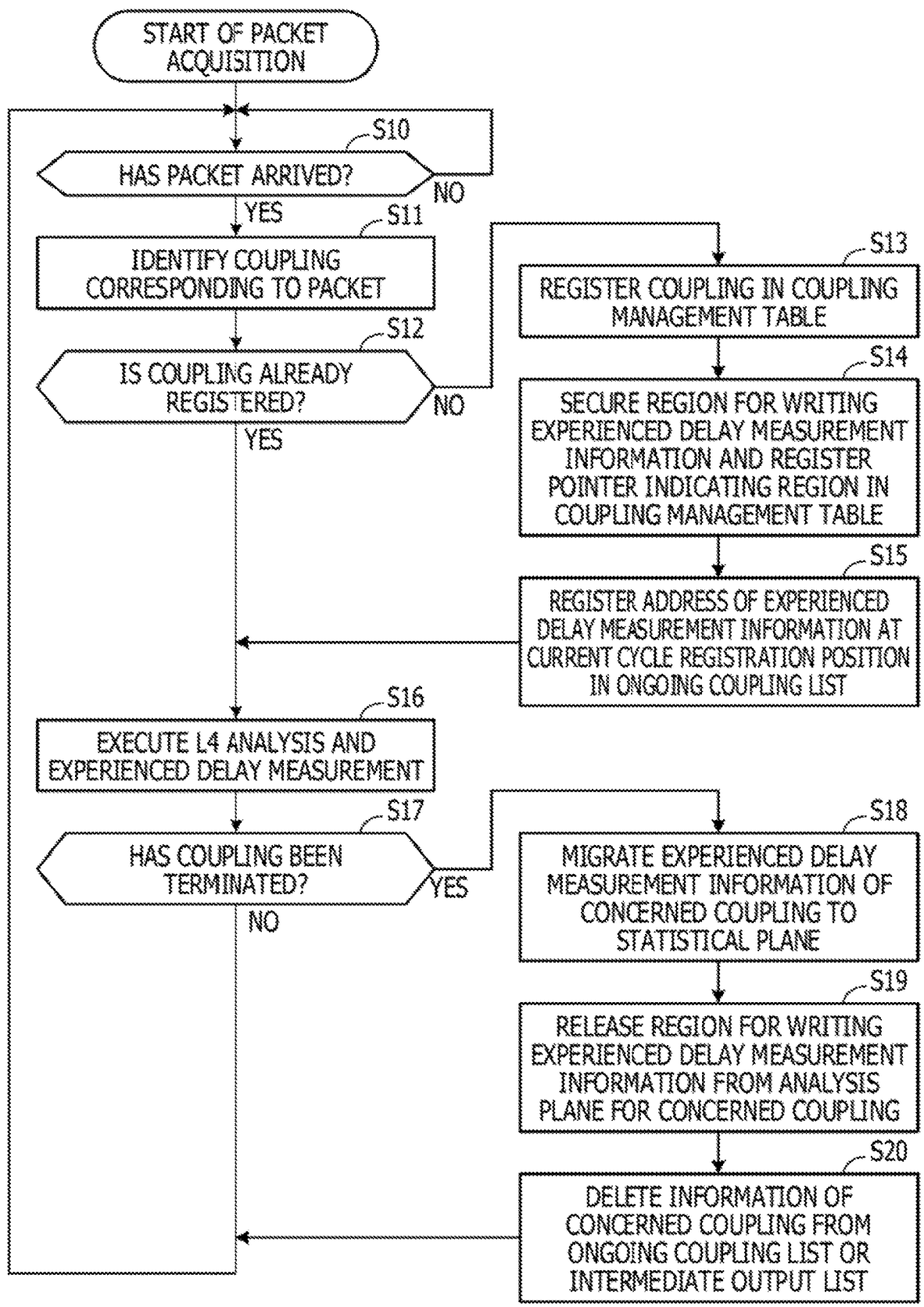
FIG. 14 is a flowchart illustrating an example of packet acquisition.

FIG. 14 is a flowchart illustrating an example of packet acquisition.

(S10) The packet information extractor 150 determines whether a packet has arrived. When the packet has arrived, the process proceeds to step S11. When the packet has not arrived, the process proceeds to step S10 (to wait until the arrival).

(S11) The packet information extractor 150 extracts, from the packet, packet information including a source IP address, a source port number, a destination IP address, a destination port number, and a protocol number and provides the extracted packet information to the L4 analyzer 160. The L4 analyzer 160 identifies a coupling corresponding to the current packet based on the packet information.

(S12) The L4 analyzer 160 determines whether the identified coupling is already registered in the coupling management table 122. When the identified coupling is already registered in the coupling management table 122, the process proceeds to step S16. When the identified coupling is not registered in the coupling management table 122, the process proceeds to step S13.

(S13) The L4 analyzer 160 registers information of the coupling corresponding to the current packet in the coupling management table 122.

(S14) The experienced delay analyzer 161 secures, for the current coupling, a region for writing experienced delay measurement information in the experienced delay analysis plane 132 and registers a pointer indicating the region in a record for the concerned coupling in the coupling management table 122.

(S15) The list controller 161*a* registers an address of the experienced delay measurement information at a current cycle registration position in the ongoing coupling list 133. For example, the list controller 161*a* adds a list element of the current coupling to a sublist indicated in the current cycle registration position information of the ongoing coupling list 133 and registers the address of the experienced delay measurement information in the list element.

(S16) The L4 analyzer 160 executes L4 analysis (measurement of the number of bytes transmitted and received between a client device and a server, the number of packets between the client and the server, the number of lost packets between the client and the server, and an RTT between the client and the server, and the like) based on the current packet. The experienced delay analyzer 161 executes the experienced delay measurement (measurement of client device and server processing periods, client device and server data transfer periods, client device and server data retransmission periods) based on the current packet. The L4 analyzer 160 (and the experienced delay analyzer 161) records the measurement results (NW quality measurement information and experienced delay measurement information) in the experienced delay analysis plane 132 as appropriate. For example, when the experienced delay analyzer 161 calculates a measured value of any (for example, the client device processing period) of the measurement items related to the experienced delay measurement for the current packet, the experienced delay analyzer 161 adds the measured value to the concerned measurement item (for example, the client device processing period) for the concerned coupling in the experienced delay measurement information.

(S17) The L4 analyzer 160 determines, based on the current acquired packet, whether the coupling corresponding to the packet has been terminated. When the coupling has been terminated, the process proceeds to step S18. When the coupling has not been terminated, the process proceeds to step S10.

(S18) The experienced delay analyzer 161 migrates the experienced delay measurement information of the terminated coupling to the statistical plane 140 (experienced delay statistical plane of the statistical plane 140).

(S19) The experienced delay analyzer 161 releases the region, included in the analysis plane 130, for writing the experienced delay measurement information of the coupling.

(S20) The list controller 161*a* deletes information (list element) of the coupling from the ongoing coupling list 133 or the intermediate output list 134. Then, the process proceeds to step S10.

Next, a procedure for the statistical process to be executed by the monitoring device 100 in the statistical cycle is described.

Figure 15:
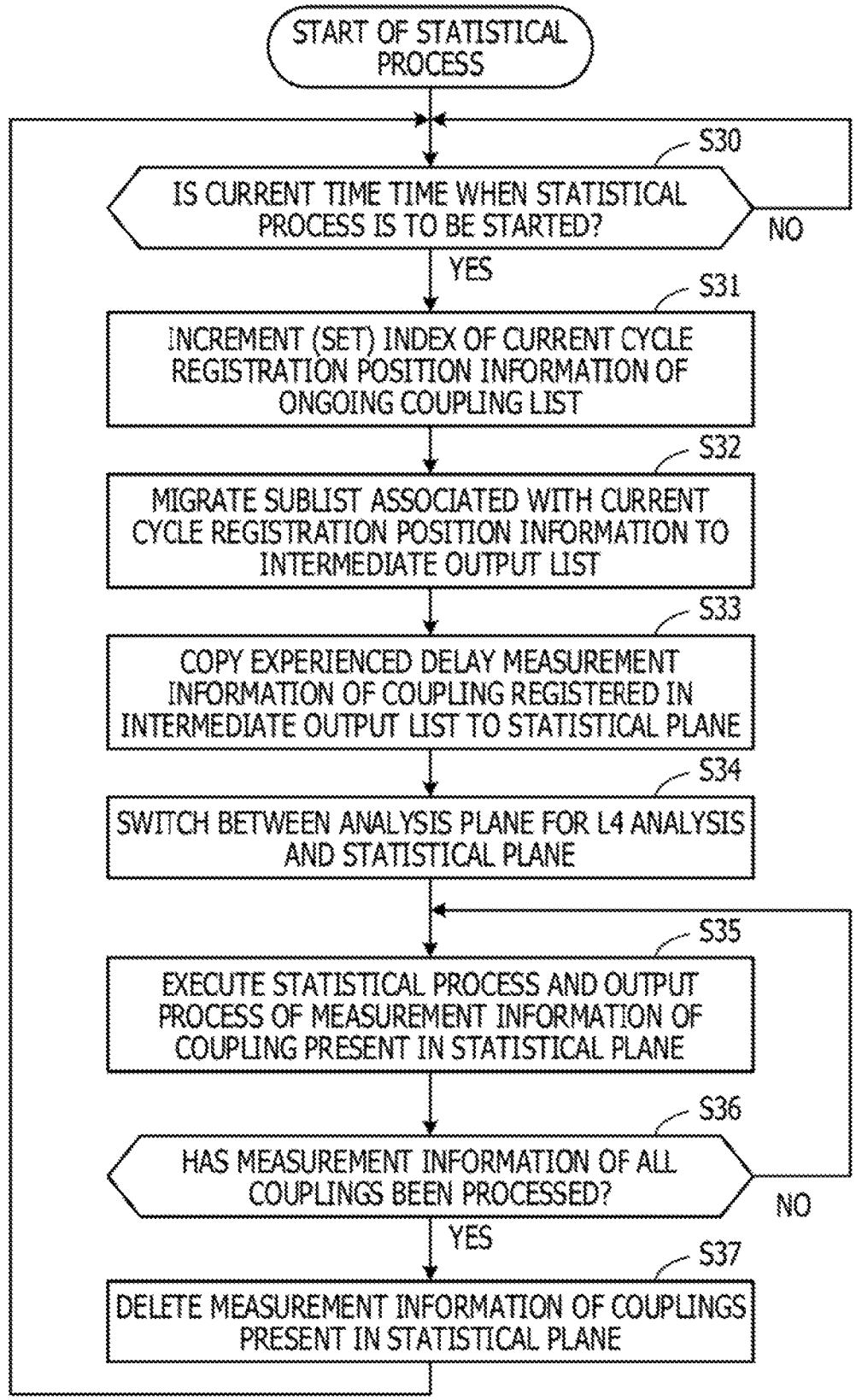
FIG. 15 is a flowchart illustrating an example of a statistical process.

FIG. 15 is a flowchart illustrating an example of the statistical process.

(S30) The statistical processing unit 170 determines whether the current time is the time when the statistical process is to be started. When the current time is the time when the statistical process is to be started, the process proceeds to step S31. When the current time is not the time when the statistical process is to be started, the process proceeds to step S30 (to wait until the current time reaches the time when the statistical process is to be started). For example, the statistical processing unit 170 may determine whether the current time is the time when the statistical process is to be started, based on whether a time range corresponding to the statistical cycle has elapsed after the time of the previous statistical process.

(S31) The statistical processing unit 170 increments (sets) the index of the current cycle registration position information 133*a* of the ongoing coupling list 133. When the index indicated in the current cycle registration position information 133*a* before the change has reached the maximum value among the indices of the index management data 133*b*, the statistical processing unit 170 sets the index of the current cycle registration position information 133*a* to the minimum value among the indices.

(S32) The statistical processing unit 170 migrates a sublist included in the ongoing coupling list 133 and associated with the current cycle registration position information 133*a* to the intermediate output list 134. As described above, the statistical processing unit 170 may remove the sublist from the ongoing coupling list 133 or may leave the sublist in the ongoing coupling list 133.

(S33) The statistical processing unit 170 copies the experienced delay measurement information, registered in the intermediate output list 134, of the coupling to the statistical plane 140 (experienced delay statistical plane 142 of the statistical plane 140).

(S34) The statistical processing unit 170 switches between the NW analysis plane 131 for the L4 analysis and the NW statistical plane 141.

(S35) The statistical processing unit 170 executes the statistical process and an output process on measurement information (NW quality measurement information and experienced delay measurement information) of the coupling present in the statistical plane 140. In the output process, the statistical processing unit 170 outputs the NW quality output information and the experienced delay measurement output information. [0226] (S36) The statistical processing unit 170 determines whether measurement information of all couplings in the statistical plane 140 has been processed (for example, whether the measurement information of all the couplings has been subjected to the process of step S35). When the measurement information of all the couplings has been processed, the process proceeds to step S37. When measurement information that is not yet processed exists, the process proceeds to step S35.

(S37) The statistical processing unit 170 deletes the measurement information (NW quality measurement information and experienced delay measurement information) of the couplings present in the statistical plane 140. Therefore, the NW statistical plane 141 and the experienced delay statistical plane 142 in the statistical plane 140 are cleared. Then, the process proceeds to step S30.

As described above, the ongoing coupling list 133 includes a larger number of sublists than the predetermined number N of times, while the multiple sublists are repeatedly set in order and associated with time ranges corresponding to the cycles. Every time the statistical cycle elapses, the statistical processing unit 170 changes, in order, a sublist that is a destination to which information of communication of an ongoing coupling is added, and the statistical processing unit 170 analyzes the quality of the communication related to the coupling indicated in the sublist after the change.

In this manner, the monitoring device 100 may analyze the quality of communication of even a coupling continuously established in continuous statistical cycles. Especially, by using the ongoing coupling list 133, an ongoing coupling to be subjected to the communication quality analysis (or, for example, to be subjected to the statistical process in the experienced delay measurement) may be identified at a high speed and with a relatively low load.

Next, comparative examples are described.

Figure 16:
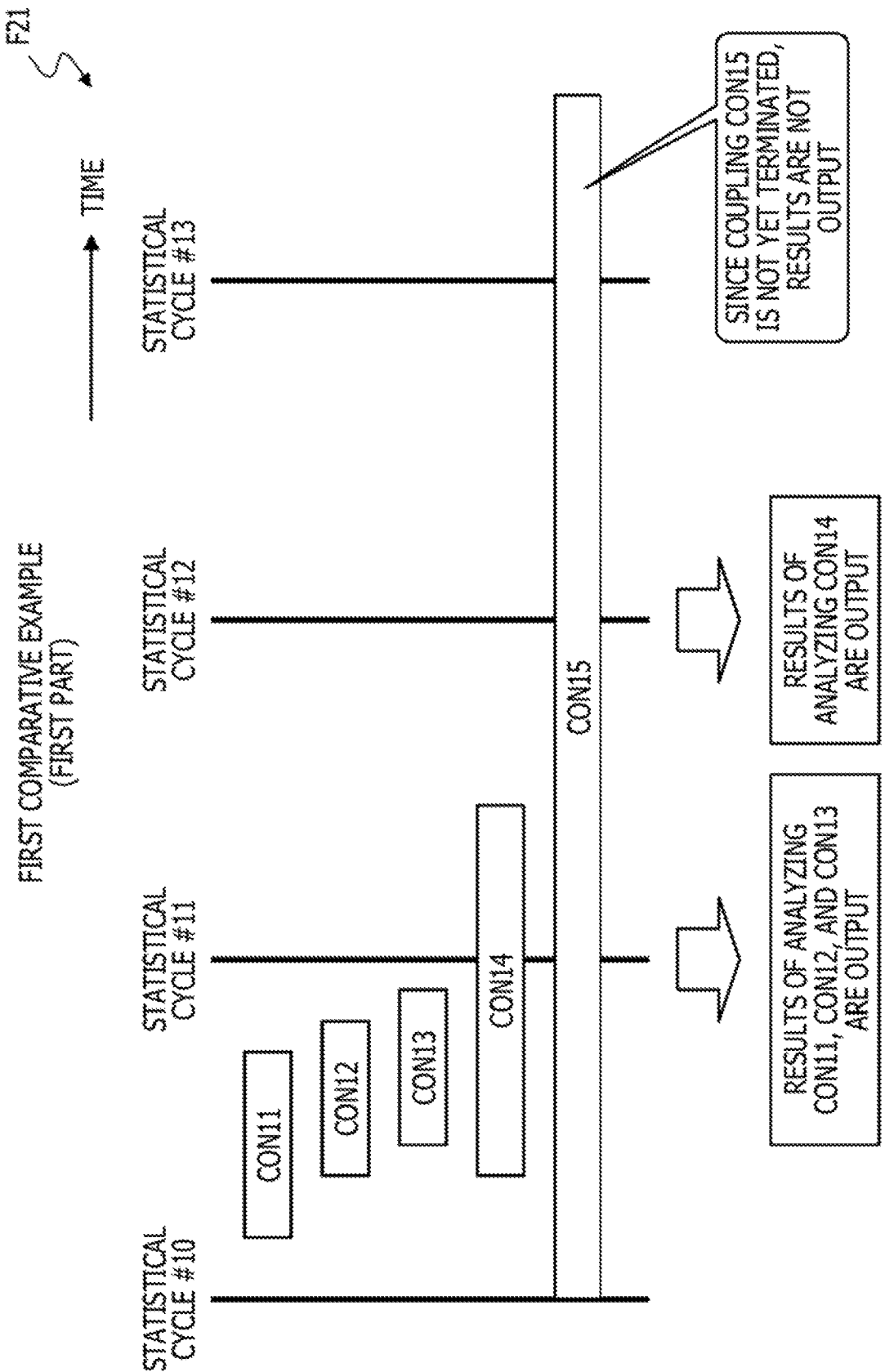
FIG. 16 is a diagram illustrating a first comparative example (first part)

FIG. 16 is a diagram illustrating a first comparative example (first part).

In the first comparative example, analysis results (statistical process results) are output only for a terminated coupling.

A time chart F21 indicates an example of couplings detected between a certain client device and a certain server. In the time chart F21, a direction from the left side to the right side is a positive direction of time. Statistical cycles #10, #11, #12, and #13 are indicated to easily clarify times when the statistical process is started to be executed.

For example, the case where couplings CON11, CON12, CON13, CON14, and CON15 are started in a time period from the start time of the statistical cycle #10 to the start time of the statistical cycle #11 is considered. In the first comparative example, for example, when the couplings CON11, CON12, and CON13 are terminated before the statistical cycle #11, results of analyzing qualities of communication of the terminated couplings CON11, CON12, and CON13 (experienced delay measurement) are output at the start time of the statistical cycle #11.

After that, when the coupling CON14 is terminated before the statistical cycle #12, results of analyzing the terminated coupling CON14 are output at the start time of the statistical cycle #12.

On the other hand, after that, when the start times of the statistical cycles #12 and #13 pass and the coupling CON15 is not terminated and is continuously executed, an analysis result is not output for a long time period. This is due to the fact that the coupling CON15 is not yet terminated.

Figure 17:
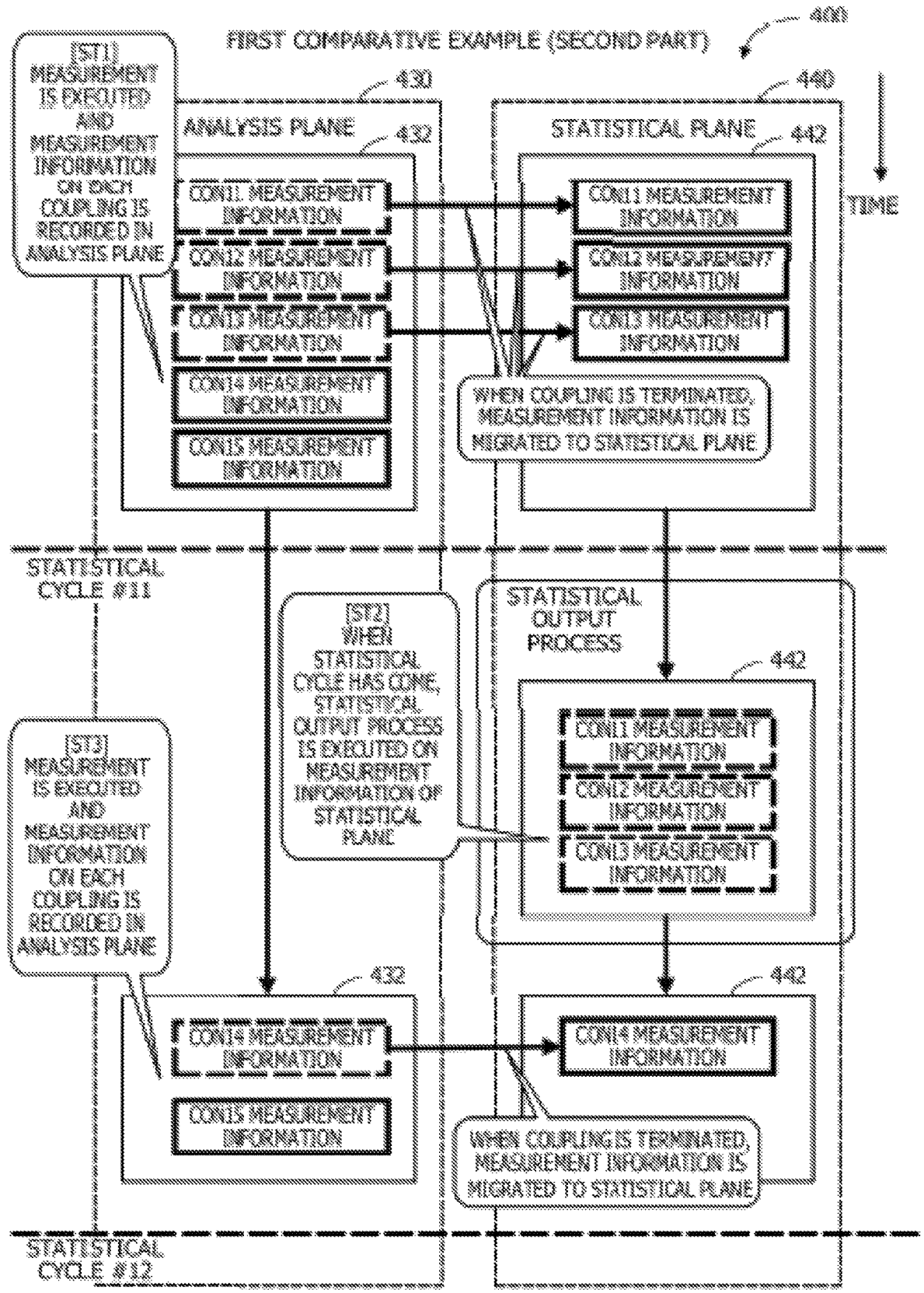
FIG. 17 is a diagram illustrating the first comparative example (second part)

FIG. 17 is a diagram illustrating the first comparative example (second part).

FIG. 17 illustrates an example of a process by a monitoring device 400 according to the first comparative example in the statistical cycles #10 and #11 illustrated in FIG. 16.

The monitoring device 400 executes experienced delay measurement on the couplings CON11, CON12, CON13, CON14, and CON15 and records experienced delay measurement information (merely represented as "measurement information" in FIG. 17) for each of the couplings in an experienced delay analysis plane 432 of an analysis plane 430 (in step ST1). Before the statistical cycle #11, the couplings CON11, CON12, and CON13 are terminated. When the couplings CON11, CON12, and CON13 are terminated, the monitoring device 400 migrates the experienced delay measurement information of each of the couplings CON11, CON12, and CON13 to an experienced delay statistical plane 442 of a statistical plane 440.

When the current time reaches the statistical cycle #11, the monitoring device 400 executes a statistical output process on the experienced delay measurement information, stored in the experienced delay statistical plane 442, of each of the couplings CON11, CON12, and CON13 (in step ST2). When the statistical output process is terminated, the monitoring device 400 deletes the experienced delay measurement information of each of the couplings CON11, CON12, and CON13 from the experienced delay statistical plane 442.

In a time period from the start time of the statistical cycle #11 to the start time of the statistical cycle #12, the monitoring device 400 continuously executes the experienced delay measurement on the couplings CON14 and CON15 and records the experienced delay measurement information of the couplings CON14 and CON15 in the experienced delay analysis plane 432 of the analysis plane 430 (in step ST3). Before the statistical cycle #12, the coupling CON14 is terminated. When the coupling CON14 is terminated, the monitoring device 400 migrates the experienced delay measurement information of the coupling CON14 to the experienced delay statistical plane 442 of the statistical plane 440. Step ST3 may be executed in parallel with step ST2.

The monitoring device 400 repeatedly executes the foregoing processes of steps ST1 to ST3, thereby outputting analysis results of the experienced delay measurement only for the terminated couplings. In this case, the experienced delay measurement information of the ongoing coupling CON15 continuously remains in the analysis plane 430, and there is a problem that an analysis result related to the coupling CON15 is not output as long as the coupling CON15 is continuously established.

Figure 18:
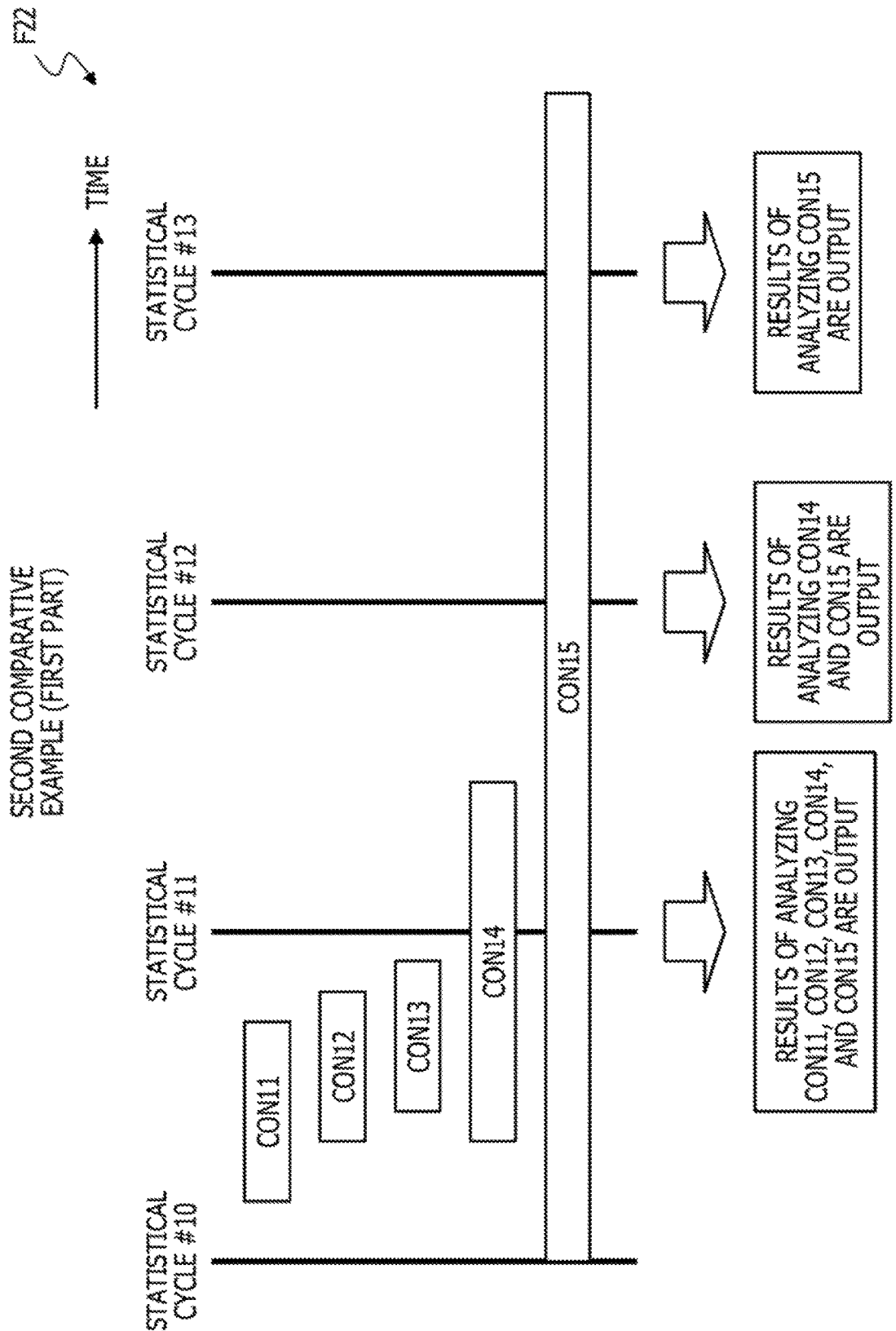
FIG. 18 is a diagram illustrating a second comparative example (first part)

FIG. 18 is a diagram illustrating a second comparative example (first part).

In the second comparative example, analysis results (statistical process results) for all couplings including an ongoing coupling are output for each statistical cycle.

A time chart F22 indicates an example of couplings detected between a certain client device and a certain server. In the time chart F22, a direction from the left side to the right side is a positive direction of time. Statistical cycles #10, #11, #12, and #13 are indicated to easily clarify times when the statistical process is started to be executed.

For example, the case where couplings CON11, CON12, CON13, CON14, and CON15 are started in a time period from the start time of the statistical cycle #10 to the start time of the statistical cycle #11 is considered. Before the statistical cycle #11, the couplings CON11, CON12, and CON13 are terminated.

In the second comparative example, at the start time of the statistical cycle #11, results of analyzing qualities of communication (experienced delay measurement) of the terminated couplings CON11, CON12, and CON13 and the ongoing couplings CON14 and CON15 are output.

After that, before the statistical cycle #12, the coupling CON14 is terminated. At the start time of the statistical cycle #12, results of analyzing the terminated coupling CON14 and the ongoing coupling CON15 are output.

After that, when the current time reaches the statistical cycle #13, results of analyzing the ongoing coupling CON15 are output.

Figure 19:
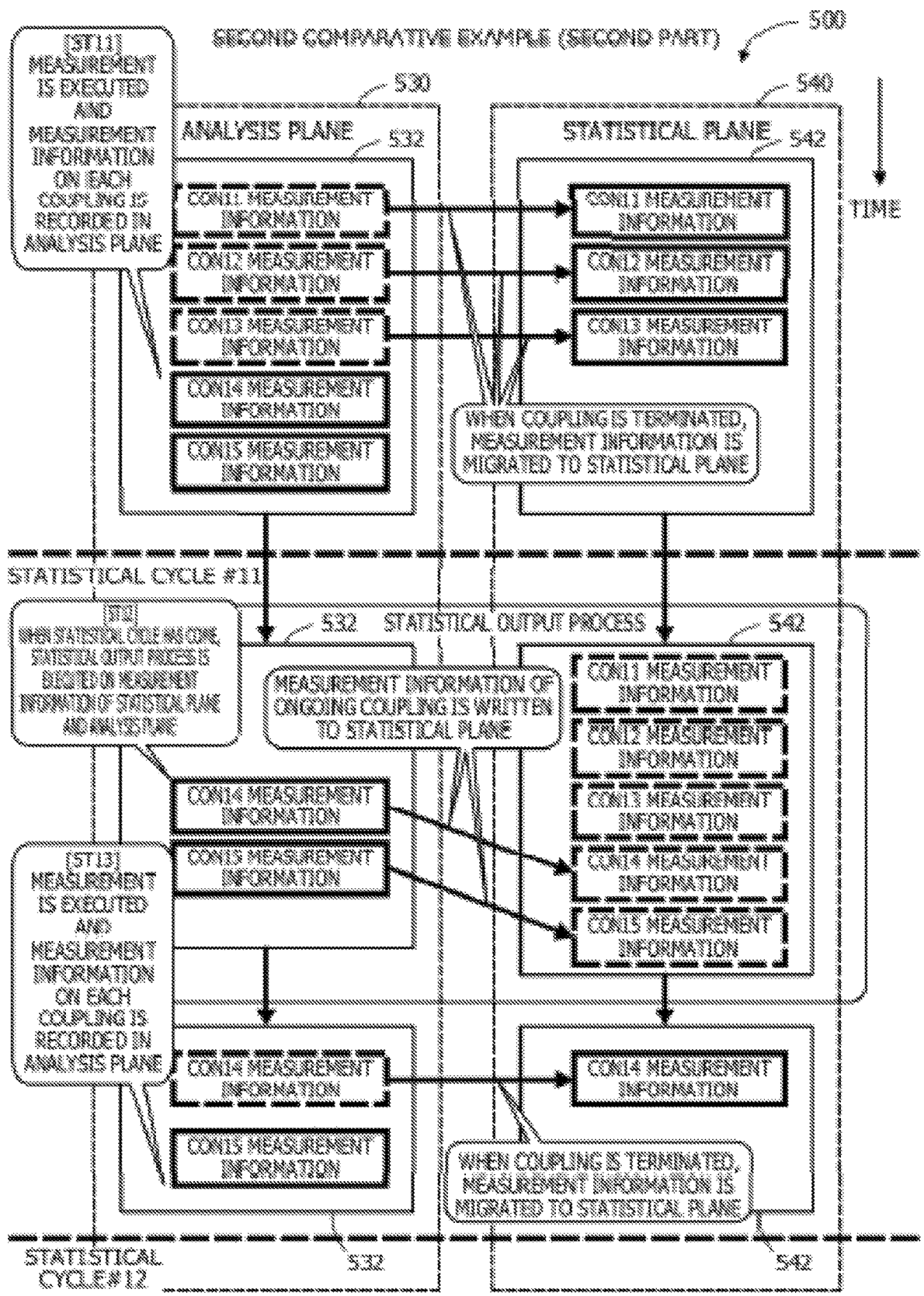
FIG. 19 is a diagram illustrating the second comparative example (second part)

FIG. 19 is a diagram illustrating the second comparative example (second part).

FIG. 19 illustrates an example of a process by a monitoring device 500 according to the second comparative example in the statistical cycles #10 and #11 illustrated in FIG. 18.

The monitoring device 500 executes experienced delay measurement on the couplings CON11, CON12, CON13, CON14, and CON15 and records experienced delay measurement information (merely represented as measurement information in FIG. 19) of the couplings in an experienced delay analysis plane 532 of an analysis plane 530 (in step ST11). Before the statistical cycle #11, the couplings CON11, CON12, and CON13 are terminated. When the couplings CON11, CON12, and CON13 are terminated, the monitoring device 500 migrates the experienced delay measurement information of each of the couplings CON11, CON12, and CON13 to an experienced delay statistical plane 542 of a statistical plane 540.

When the current time reaches the statistical cycle #11, the monitoring device 500 writes (copies) the experienced delay measurement information of the ongoing couplings CON14 and CON15 to the experienced delay statistical plane 542. Then, the monitoring device 500 executes a statistical output process on the experienced delay measurement information, stored in the experienced delay statistical plane 542, of each of the couplings CON11, CON12, CON13, CON14, and CON15 (in step ST12). When the statistical output process is terminated, the monitoring device 500 deletes the experienced delay measurement information of each of the couplings CON11, CON12, CON13, CON14, and CON15 from the experienced delay statistical plane 542.

In a time period from the start time of the statistical cycle #11 to the start time of the statistical cycle #12, the monitoring device 500 continuously executes the experienced delay measurement on the couplings CON14 and CON15 and records the experienced delay measurement information of the couplings CON14 and CON15 in the experienced delay analysis plane 532 of the analysis plane 530 (in step ST13). Before the statistical cycle #12, the coupling CON14 is terminated. When the coupling CON14 is terminated, the monitoring device 500 migrates the experienced delay measurement information of the coupling CON14 to the experienced delay statistical plane 542 of the statistical plane 540. Step ST13 may be executed in parallel with step ST12.

The monitoring device 500 repeatedly executes the foregoing processes of step ST11 to ST13, thereby outputting analysis results of the experienced delay measurement executed on the terminated couplings and the ongoing couplings every time the statistical cycle elapses. In this case, the number of couplings to be subjected to the statistical process in each statistical cycle and to be subjected to the output process in each statistical cycle may be excessively large and a load of the monitoring device 500 may be excessively large.

For example, in the process according to the second comparative example, a load occurs due to copying of measurement information of all ongoing couplings being processed with the analysis plane 530 in step ST12 to the statistical plane 540 and the execution of the statistical output process on the measurement information occurs. However, when all the ongoing couplings are to be subjected to the statistical output process, an ongoing coupling that is not to be processed in a certain statistical cycle may be included in the couplings to be processed. For example, immediately after a concerned coupling is continuously established in continuous statistical cycles, the concerned coupling may be terminated. In this case, it is sufficient if the output is executed in a statistical cycle immediately after the statistical cycle in which the coupling is terminated. However, the statistical cycle is normally approximately 60 seconds, but may be set to a short cycle of approximately 1 second. Therefore, it may not be preferable that the output be executed after 1 statistical cycle elapses.

Therefore, the monitoring device 100 according to the second embodiment executes the foregoing processes of steps ST11 and ST13 and uses the ongoing coupling list 133 and the intermediate output list 134 to control experienced delay measurement information to be written to the statistical plane in step ST12.

It is, therefore, possible to analyze the quality of communication of a coupling continuously established in continuous statistical cycles.

Especially, a load of the monitoring device 100 may be reduced by treating, as a target to be subjected to the communication quality analysis, a coupling continuously established for a time period in which the statistical cycle has continuously repeated the predetermined number (for example, 2) of times or more, compared to the case where all ongoing couplings are treated as targets to be analyzed for each statistical cycle. For example, when the monitoring device 100 becomes highly loaded, the probability that the analysis may not be completed within a certain time range (for example, within a next cycle) increases, and it may take time to recognize the latest communication status. The monitoring device 100 treats, as a target to be subjected to the communication quality analysis, a coupling continuously established for a time period in which the statistical cycle has continuously repeated the predetermined number of times or more. Therefore, the monitoring device 100 may reduce the load of the monitoring device 100, suppress a delay in the analysis, and quickly recognize the latest communication status.

Since the monitoring device 100 determines, for each coupling, whether the statistical cycle has elapsed the predetermined number of times or more after the addition of information of the coupling to the ongoing coupling list 133, the monitoring device 100 may quickly determine a target to be analyzed. For example, it is considered that a time elapsed after the start (establishment) of a coupling is measured and compared with a threshold or the like and a coupling that is continuously established for a time period longer than the threshold is to be analyzed. In this method, however, as the number of couplings increases, processing costs for the measurement of elapsed time periods for which the couplings are continuously established and the comparison with the threshold increase, and it takes time to determine a target to be analyzed. On the other hand, as described above, since the monitoring device 100 uses the ongoing coupling list 133, the monitoring device 100 may quickly determine a target to be analyzed, compared to the case where an elapsed time period is calculated for each of couplings and compared with the threshold.

Third Embodiment

Next, a third embodiment is described. Items different from the foregoing second embodiment will be mainly described, and the descriptions of the common items will be omitted.

As exemplified in the second embodiment, the system administrator may set, in the monitoring device 100, the number (predetermined number N of times) of statistical cycles in which forced output is suspended. However, an access pattern of a user who uses a service and an access destination trend vary depending on the service and a service usage time. Therefore, when the statistical cycle has come, information that affects an experienced delay may have already been measured for a coupling for a certain service. Even when the statistical cycle has come, the information that affects the experienced delay may not have been measured. Therefore, by narrowing down couplings to a coupling for which information that affects an experienced delay is estimated to have been measured and treating the coupling as a target to be subjected to the forced output, a processing load of the monitoring device 100 may be further reduced.

Therefore, the third embodiment provides a function of dynamically determining, based on a status of a coupling to be monitored and the processing load, whether the statistical process is actually executed or not when the statistical cycle has come.

An example of an information processing system according to the third embodiment and hardware of each of devices are the same as or similar to the information processing system exemplified in FIG. 2 and the hardware exemplified in FIG. 3 in the second embodiment.

Figure 20:
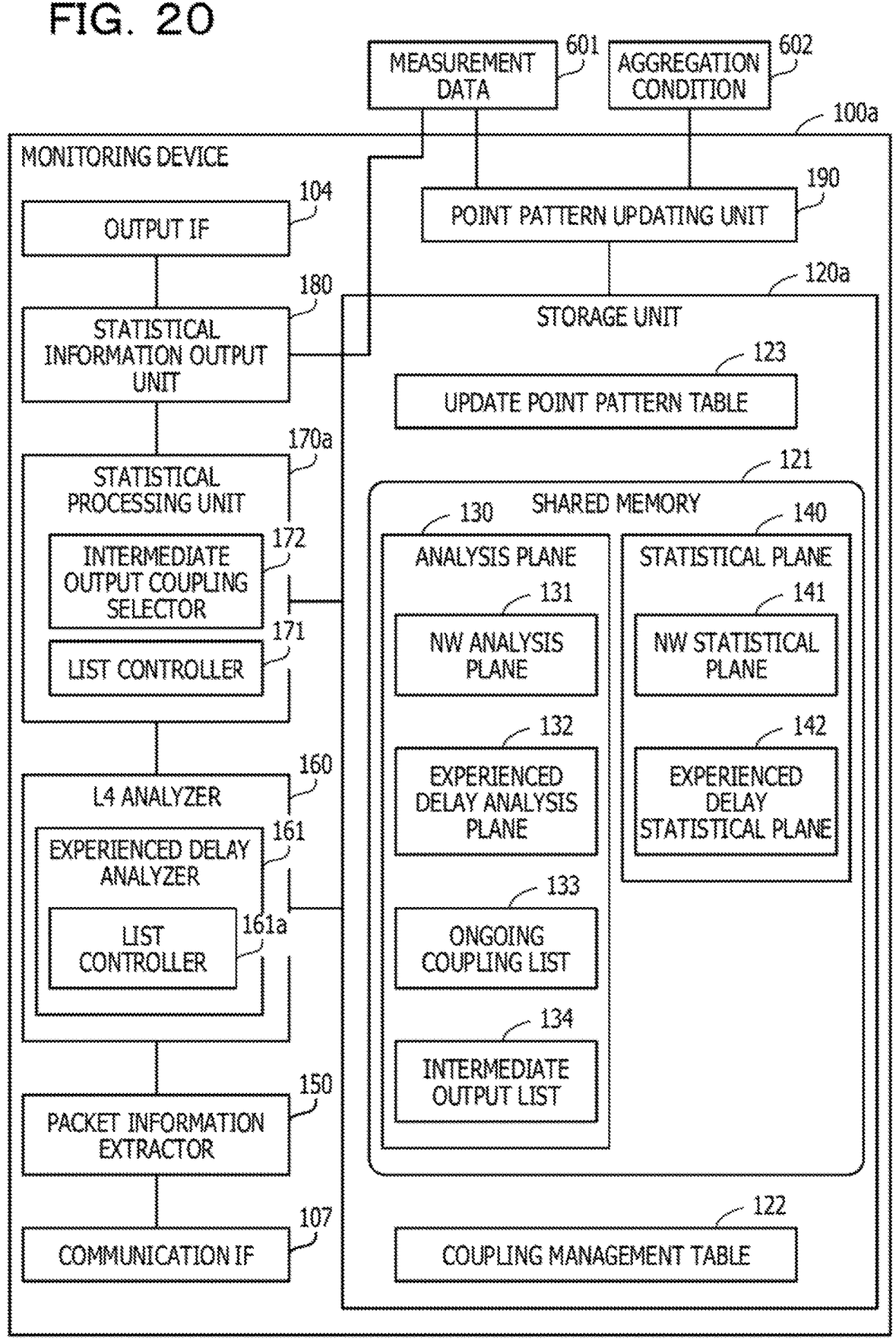
FIG. 20 is a block diagram illustrating an example of functions of a monitoring device according to a third embodiment.

FIG. 20 is a block diagram illustrating an example of functions of a monitoring device according to the third embodiment.

The monitoring device 100a includes a storage unit 120a, a packet information extractor 150, an L4 analyzer 160, a statistical processing unit 170a, a statistical information output unit 180, and a point pattern updating unit 190. The storage unit 120a is realized using a storage region of the RAM 102 or a storage region of the HDD 103. The packet information extractor 150, the L4 analyzer 160, the statistical processing unit 170a, the statistical information output unit 180, and the point pattern updating unit 190 are realized by causing the CPU 101 of the monitoring device 100a to execute a packet analysis program stored in the RAM 102 of the monitoring device 100a. FIG. 20 also illustrates the output IF 104 of the monitoring device 100a and the communication IF 107 of the monitoring device 100a to easily clarify relationships between configurations.

The storage unit 120a includes a shared memory 121, a coupling management table 122, and an update point pattern table 123. The shared memory 121 and the coupling management table 122 are the same as the elements having the same names and the same reference signs as those described in the second embodiment, and will not be described.

The update point pattern table 123 holds information of standards for effect levels of changes (for example, updated measurement items) in states on a delay experienced by a user. The standards for the effect levels are represented by points indicating the magnitude of the effect levels of the measurement items on the delay experienced by the user. The measurement items are a server processing period, a client device processing period, a server data transfer period, a server data retransmission period, a client device data transfer period, and a client device data retransmission period.

The packet information extractor 150, the L4 analyzer 160, and the statistical information output unit 180 are the same as the elements having the same names and the same reference signs as those described in the second embodiment, and will not be described. The experienced delay analyzer 161 of the L4 analyzer 160, however, adds an update management bitmap to the experienced delay measurement information stored in the experienced delay analysis plane 132. The update management bitmap indicates whether each of the measurement items has been updated.

The statistical processing unit 170a corresponds to the statistical processing unit 170 according to the second embodiment. The statistical processing unit 170a is different from the statistical processing unit 170 in that the statistical processing unit 170a Includes an intermediate output coupling selector 172, as well as the list controller 171.

The intermediate output coupling selector 172 selects, based on the update point pattern table 123 and the update management bitmap, an ongoing coupling to be actually subjected to intermediate output from among ongoing couplings registered in the intermediate output list 134. In this case, the intermediate output coupling selector 172 determines the number (number of couplings allowed to be subjected to the forced output) of ongoing couplings to be subjected to the intermediate output, based on relationships between the number of past couplings and a total statistical process period.

For example, the intermediate output coupling selector 172 calculates time periods for the following 3 processes in the statistical process per coupling based on results. The first time period is a time period A for a statistical process executed on an experienced delay of a normal coupling (for example, a terminated coupling). The second time period is a time period B for a statistical process (including copying of experienced delay measurement information from the analysis plane 130 to the statistical plane 140) executed on an experienced delay of a forced output coupling (coupling to be subjected to the intermediate output among ongoing couplings). The third time period is a time period C for the statistical process (NW statistical process) related to the NW quality.

In this case, a processing period for the statistical process is calculated according to Equation (1).

$$\text{The processing period for the statistical process} = A \times \text{the number of normal couplings} + B \times \text{the number of forced output couplings} + C \times \text{the number of couplings to be subjected to the } NW \text{ statistical process} \quad (1)$$

An upper limit (or the number of couplings allowed to be subjected to the forced output) on the number of forced output couplings that is allowed to complete the statistical process within the statistical cycle T is calculated for the statistical cycle T according to Equation (2).

$$\text{The number of couplings allowed to be subjected to the forced output} = (\text{the statistical cycle } T - (A \times \text{the number of normal couplings} + C \times \text{the number of couplings to be subjected to the } NW \text{ statistical process}))/B \quad (2)$$

The intermediate output coupling selector 172 determines the number of couplings allowed to be subjected to the forced output according to Equation (2). The intermediate output coupling selector 172 prioritizes an ongoing coupling for which a measurement item has been updated so that the measurement item has a high effect level on a user experience. Then, the intermediate output coupling selector 172 treats the prioritized ongoing coupling as a target to be subjected to the intermediate output.

The point pattern updating unit 190 updates the update point pattern table 123 based on measurement data 601 output by the statistical information output unit 180 and an aggregation condition 602. The measurement data 601 is data of measured values of measurement items that are a server data transfer period, a client device data transfer period, and the like. The aggregation condition 602 indicates a node (an IP address, a port number, and the like of a client device or an IP address, a port number, and the like of a server) to which an update point pattern after an update is to be applied. The point pattern updating unit 190 updates a point indicating an effect level on a user-experienced delay for each of the measurement items, based on the trend of a measurement status for each of the measurement items.

Figure 21:
FIG. 21 is a diagram illustrating an example of an update point pattern table.

FIG. 21 is a diagram illustrating an example of the update point pattern table.

The update point pattern table 123 includes items for coupling establishment, a SYN retransmission period, a client device transfer period, a client device retransmission period, a server transfer period, a server retransmission period, a client device processing period, a server processing period, and an idle period.

In the coupling establishment item, a point indicating an effect level of a delay caused by coupling establishment on a user-experienced delay is registered. In the SYN retransmission period item, a point indicating an effect level of a delay caused by SYN retransmission on the user-experienced delay is registered. In the client device transfer period item, a point indicating an effect level of a delay caused by data transfer by a client device on the user-experienced delay is registered. In the client device retransmission period item, a point indicating an effect level of a delay caused by data retransmission by the client device on the user-experienced delay is registered. In the server transfer period item, a point indicating an effect level of a delay caused by data transfer by a server on the user-experienced delay is registered. In the server retransmission period item, a point indicating an effect of a delay caused by data retransmission by the server on the user-experienced delay is registered. In the client device processing period item, a point indicating an effect level of a delay caused by processing by the client device on the user-experienced delay is registered. In the server processing period item, a point indicating an effect level of a delay caused by processing by the server on the user-experienced delay is registered. In the idle period item, a point indicating an effect level of a time period for waiting for an operation by a user on the user-experienced delay is registered.

For example, as the value of a point indicating an effect level is larger, the effect level is larger. For example, as the value is smaller, the effect level is smaller.

FIG. 21 exemplifies an example 700 of the effect levels on the user-experienced delay. For example, since the idle period is a time period for waiting for an operation by a user, the idle period does not affect the user-experienced delay. Therefore, in the update point pattern table 123, the point for the idle period is "0".

Effects of the coupling establishment, the SYN retransmission period, the client device transfer period, and the server transfer period on the user-experienced delay are relatively small. Therefore, in the update point pattern table 123, the points for the coupling establishment, the SYN retransmission period, the client device transfer period, and the server transfer period are "1".

Effects of the client device retransmission period and the server retransmission period on the user-experienced delay are medium. Therefore, in the update point pattern table 123, the points for the client device retransmission period and the server retransmission period are "2".

Effects of the client device processing period and the server processing period on the user-experienced delay are relatively large. Therefore, in the update point pattern table 123, the points for the client device processing period and the server processing period are "3".

The effect levels exemplified in the example 700 of the effect levels, however, indicate a general trend and may vary depending on a service, a service usage time, or the like.

FIG. 22 is a diagram illustrating an example of the experienced delay measurement information.

Experienced delay measurement information 132*b* is stored in the experienced delay analysis plane 132. The experienced delay measurement information 132*b* includes items for coupling establishment period update information, SYN retransmission period update information, client device transfer period update information, client device retransmission period update information, server transfer period update information, server retransmission period update information, client device processing period update information, server processing period update information, and idle period update information, as well as the items of the experienced delay measurement information 132*a* exemplified in the second embodiment.

The coupling establishment period update information is information (flag) of 1 bit indicating whether a coupling establishment period indicated in the experienced delay measurement information 132*b* has been updated for a concerned coupling. In this case, information of 1 bit "0" indicates that an update has not been executed and information of 1 bit "1" indicates that an update has been executed (the same applies to the other update information). The SYN retransmission period update information is a flag indicating whether a SYN retransmission period indicated in the experienced delay measurement information 132*b* has been updated for the concerned coupling. The client device transfer period update information is a flag indicating whether a client device data transfer period indicated in the experienced delay measurement information 132*b* has been updated for the concerned coupling. The client device retransmission period update information is a flag indicating whether a client device data retransmission period indicated in the experienced delay measurement information 132*b* has been updated for the concerned coupling. The server transfer period update information is a flag indicating whether a server data transfer period indicated in the experienced delay measurement information 132*b* has been updated for the concerned coupling. The server retransmission period update information is a flag indicating whether a server data retransmission period indicated in the experienced delay measurement information 132*b* has been updated for the concerned coupling. The client device processing period update information is a flag indicating whether a client device processing period indicated in the experienced delay measurement information 132*b* has been updated for the concerned coupling. The server processing period update information is a flag indicating whether a server processing period indicated in the experienced delay measurement information 132*b* has been updated for the concerned coupling. The idle period update information is a flag indicating whether an idle period indicated in the experienced delay measurement information 132*b* has been updated for the concerned coupling.

A bit string portion that is included in the experienced delay measurement information 132*b* is referred to as an update management bitmap 135. The bit string portion corresponds to the items for the coupling establishment period update information, the SYN retransmission period update information, the client device transfer period update information, the client device retransmission period update information, the server transfer period update information, the server retransmission period update information, the client device processing period update information, the server processing period update information, and the idle period update information.

FIG. 23 is a diagram illustrating an example of the calculation of an effect level.

The intermediate output coupling selector 172 calculates an update point related to a concerned ongoing coupling based on the update point pattern table 123 and the update management bitmap 135. In FIG. 23, in the update management bitmap 135, an illustration of character strings of "update Information" is omitted.

The intermediate output coupling selector 172 calculates a product (pxf) of a point p of the update point pattern table 123 and a flag f of the update management bitmap 135 for each of the measurement items. The intermediate output coupling selector 172 calculates an effect level per coupling by summing the products (pxf) for all the measurement items.

In the example illustrated in FIG. 23, flags for the client device transfer period, the server transfer period, and the server processing period are "1" and flags for the other measurement items are "0" in the update management bitmap 135. Therefore, an effect level for the concerned coupling is 1×0+1×0+1×1+2×0+1×1+2×0+3×0+3×1+0×0=5. FIG. 23 illustrates the products (pxf) only for the measurement items with the flags of "1" in the update management bitmap 135.

As the effect level calculated for the ongoing coupling in the foregoing manner is larger, a priority for the intermediate output is evaluated to be higher. For example, the intermediate output coupling selector 172 may treat, as a target to be subjected to the intermediate output, an ongoing coupling with an effect level calculated per coupling and larger than a predetermined threshold. Alternatively, the intermediate output coupling selector 172 may determine the foregoing number of couplings allowed to be subjected to the forced output, and select ongoing couplings to be subjected to the intermediate output in descending order of effect level calculated per coupling until the number of selected couplings reaches the number of couplings allowed to be subjected to the forced output.

However, as described above, the points in the update point pattern table 123 may not be appropriate. Therefore, the point pattern updating unit 190 updates the update point pattern table 123 as follows.

Figure 24:
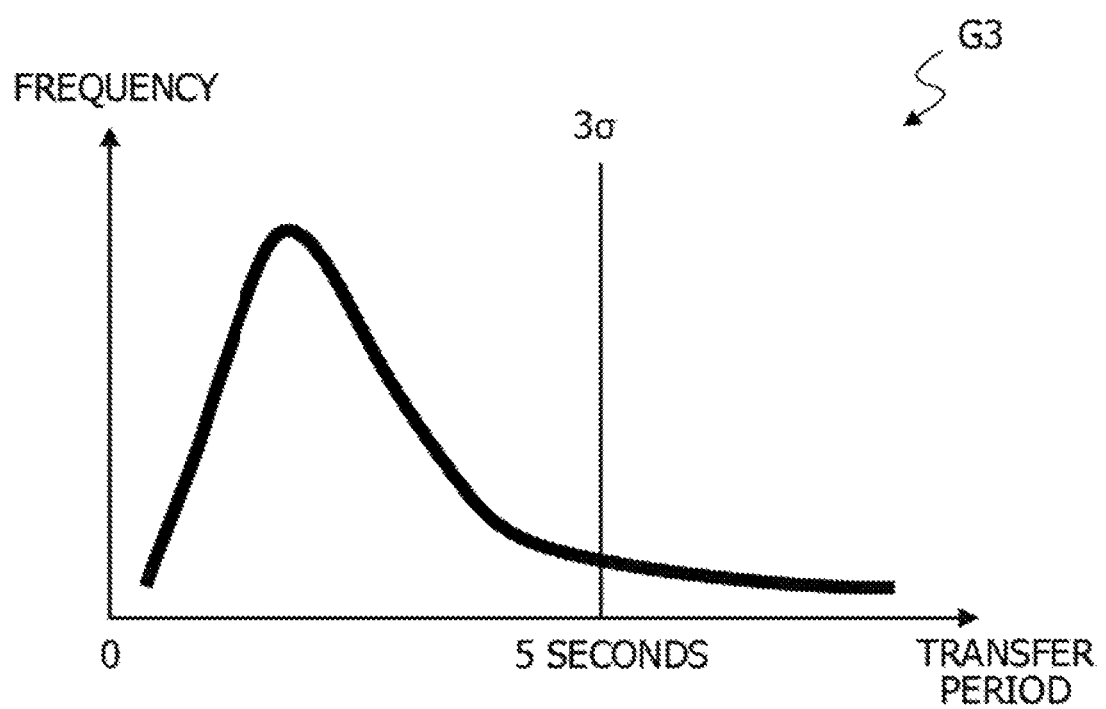
FIG. 24 is a diagram illustrating an example of a distribution of server data transfer periods.

FIG. 24 is a diagram illustrating an example of a distribution of server data transfer periods.

A graph G3 indicates an example of a distribution of server data transfer periods measured for a certain coupling. For example, a service provided by a certain server may be a data transfer related service (for example, a service using Common Internet File System (CIFS), File Transfer Protocol (FTP), or the like). In this case, a measured value related to a data transfer period is relatively larger than that obtained in standard web access, and the probability that the measured value affects a user-experienced delay increases. For example, in the case where a time period for data transfer between a client device and a server increases twofold, a delay time in the case where the original transfer period increases from 5 milliseconds (ms) to 10 milliseconds is largely different from a delay time in the case where the original transfer period increases from 5 seconds to 10 seconds, and an effect level on user's experience varies.

Therefore, the point pattern updating unit 190 changes the points for the measurement items in the update point pattern table 123 so that effects on user's experience are able to be more accurately reflected.

As an example, first, the point pattern updating unit 190 confirms, from a distribution of measured values of past server data transfer periods, a distribution of measured values of client device data transfer periods, or the like, a predetermined statistical value (for example, an average value+3a) related to the measured values. In this case, a indicates a standard deviation of the distribution. For example, the point pattern updating unit 190 aggregates and calculates measured values once a day for several days as measured values of the past server data transfer periods, the past client device data transfer periods, or the like in accordance with conditions for a destination IP address, a destination port, and the like.

Next, the point pattern updating unit 190 crosschecks the acquired statistical value with a point standard and determines a point after a change. The point standard is given to the point pattern updating unit 190 in advance. For example, it is considered that the point standard is a point "1" when the acquired statistical value is shorter than 500 ms, a point "2" when the acquired statistical value is equal to or longer than 500 ms and shorter than 10 seconds, and a point "3" when the acquired statistical value is equal to or longer than 10 seconds. As indicated by the graph G3, when 5 seconds are obtained as a statistical value of the server data transfer periods, a point after an update that is based on the foregoing point standard and is related to the server data transfer periods is "2".

Figure 25:
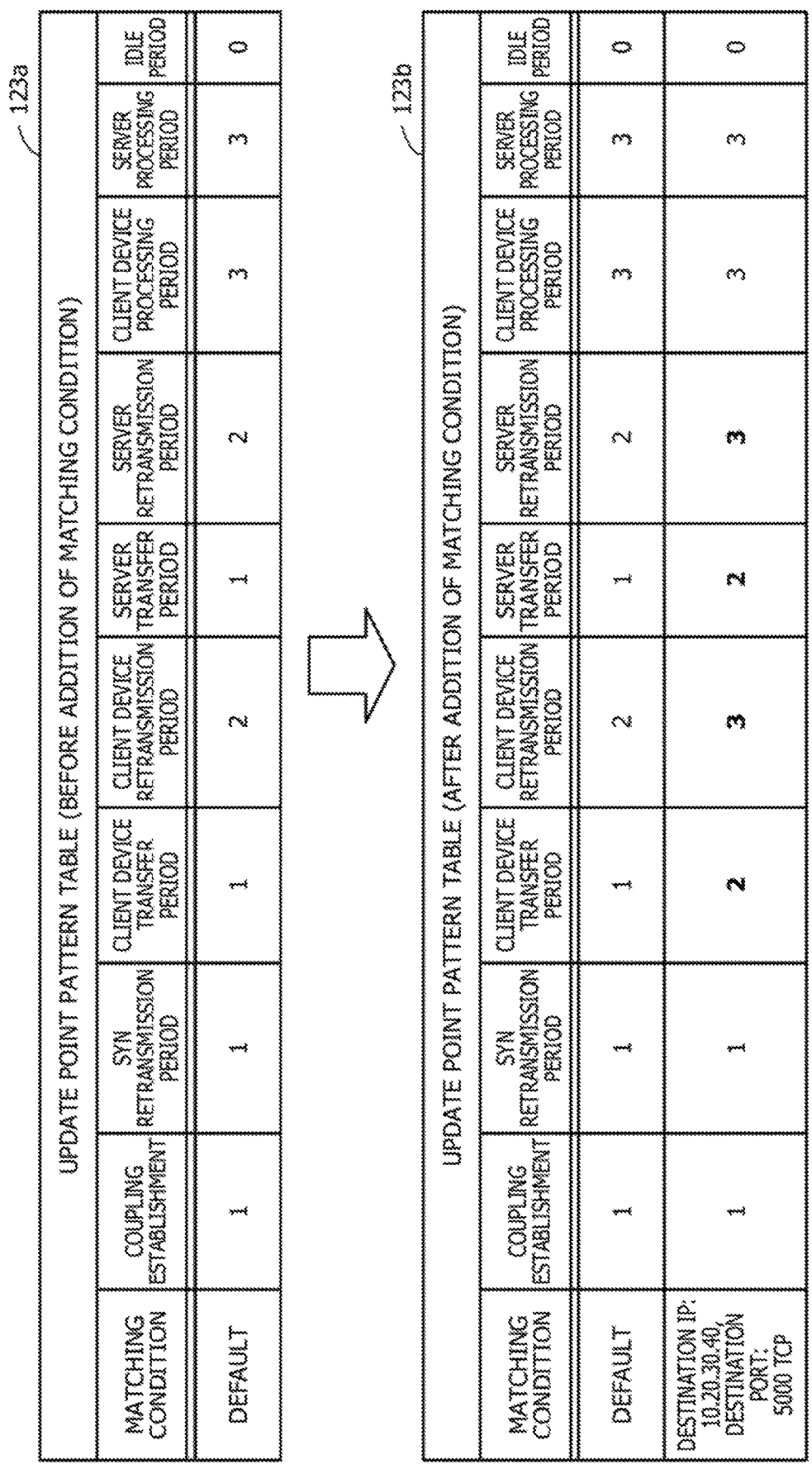
FIG. 25 is a diagram illustrating an example of an update of an update point pattern table.

FIG. 25 is a diagram illustrating an example of an update of the update point pattern table.

The point pattern updating unit 190 acquires, for access matching a predetermined condition, measured values of past server data transfer periods and the like. For example, for access to an IP address "10.20.30.40" and a TCP port number "5000", measured values of each of the measurement items are aggregated and a statistical value (average value+3σ) is calculated.

As described above, according to the point standard exemplified, when a statistical value of server data transfer periods is 5 seconds, a point after the update that is related to the server data transfer periods is "2". According to the point standard exemplified, when a statistical value of client device data transfer periods is 2 seconds, a point after the update that is related to the client device data transfer periods is "2".

When retransmission is executed, a delay caused by the retransmission is likely to be larger than the order of the foregoing point standard. Therefore, the point pattern updating unit 190 increases or reduces a point for a time period for the retransmission in coordination with an increase or decrease in a point for a transfer period. For example, the point pattern updating unit 190 changes, based on a change in the point after the update that is provided for the server data transfer periods, a point after the update that is provided for server data retransmission periods to "3" higher than the point "2" after the update that is provided for the server data transfer periods. Similarly, the point pattern updating unit 190 changes a point after the update that is provided for client device data retransmission periods to "3" higher than the point "2" after the update that is provided for the client device data transfer periods.

The point pattern updating unit 190, however, may use the predetermined point standard given in advance to determine a point after the update that is for retransmission periods based on a distribution of measured values of past retransmission periods, like the server data transfer periods and the client device data transfer periods.

FIG. 25 exemplifies an update point pattern table 123a before changes in the foregoing points and an update point pattern table 123b after the changes in the points.

Each of the update point pattern tables 123a and 123b indicates an item for a matching condition, as well as the items of the update point pattern table 123. In the item for the matching condition, information indicating a condition for applying an update point pattern is set when the condition is added. The matching condition is input as the aggregation condition 602 by a user to the monitoring device 100a. Regarding an update point pattern that is initially present in the update point pattern table 123a (or the update point pattern table 123), information that indicates the foregoing and is "default" is set in the item for the matching condition.

In the example of the update point pattern table 123b, the point pattern updating unit 190 changes an update point pattern for access to the IP address "10.20.30.40" and the TCP port number "5000". Therefore, the point pattern updating unit 190 adds the update point pattern corresponding to a matching condition indicating "destination IP: 10.20.30.40, destination port: 5000 TCP" to the update point pattern table 123b while leaving a "default" update point pattern. Then, for a coupling meeting the matching condition, an update point pattern meeting the matching condition is used to calculate update points. For a coupling not meeting the matching condition, the default update point pattern is used to calculate update points.

Next, a process procedure by the monitoring device 100a is described. As an example of the update point pattern table 123, the update point pattern table 123b is described below.

Figure 26:
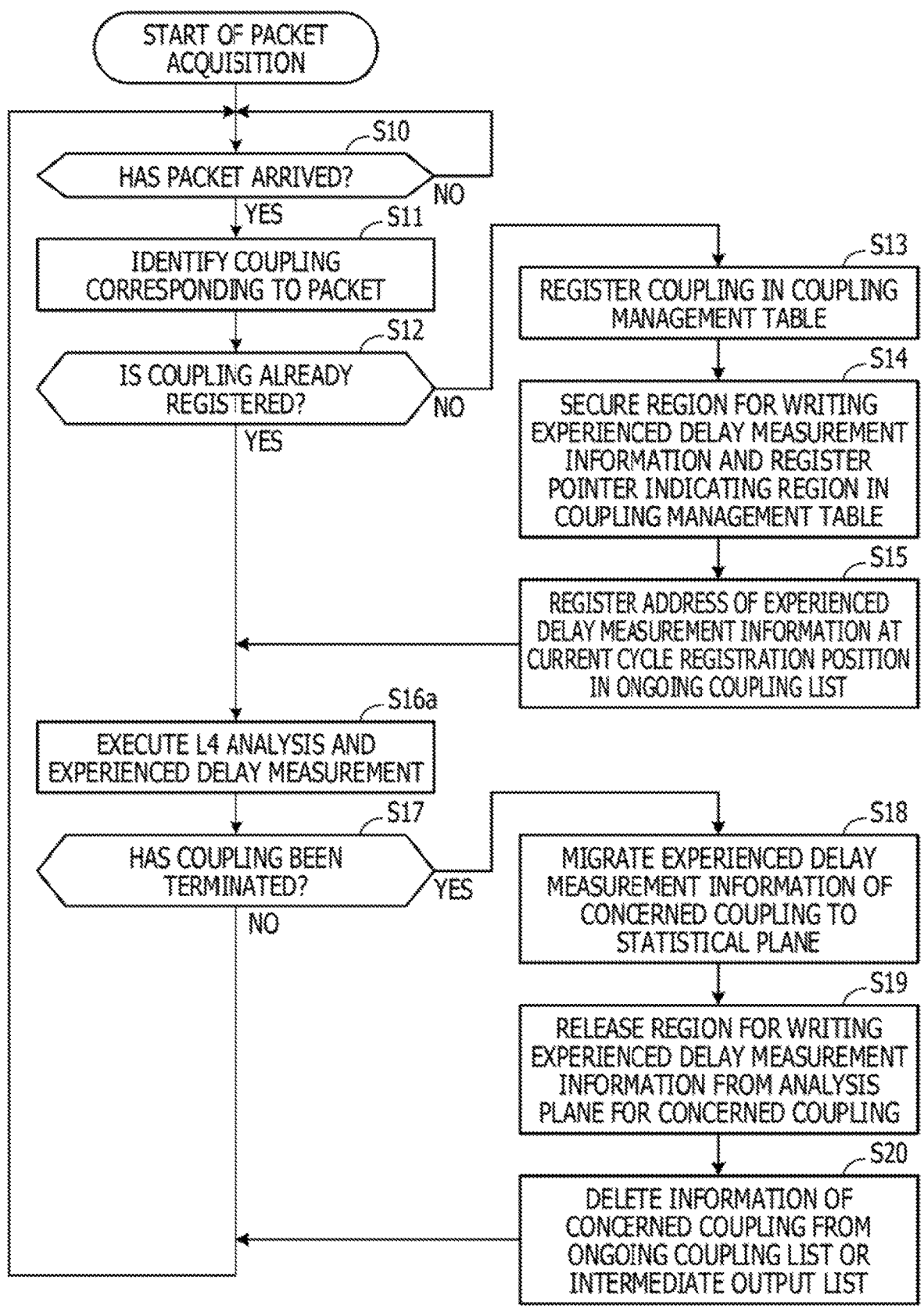
FIG. 26 is a flowchart illustrating an example of packet acquisition.

FIG. 26 is a flowchart illustrating an example of packet acquisition.

Details of processes of steps S10 to S15 and S17 to S20 are the same as or similar to steps S10 to S15 and S17 to S20 exemplified in FIG. 14, and will not be described. The monitoring device 100a executes step S16a, instead of step S16. Step S16a is executed when the answer to step S12 is YES or after step S15.

(S16a) The L4 analyzer 160 executes the L4 analysis (measurement of the number of bytes transmitted and received between a client device and a server, the number of packets between the client device and the server, the number of lost packets between the client device and the server, and an RTT between the client device and the server, and the like) based on a current packet. The experienced delay analyzer 161 executes the experienced delay measurement (measurement of client device and server processing periods, client device and server data transfer periods, client device and server data retransmission periods) based on the current packet. The L4 analyzer 160 (and the experienced delay analyzer 161) records the measurement results (NW quality measurement information and experienced delay measurement information) in the experienced delay analysis plane 132 as appropriate. For example, when the experienced delay analyzer 161 calculates a measured value of any (for example, the client device processing period) of the measurement items related to the experienced delay measurement for the current packet the experienced delay analyzer 161 adds the measured value to the concerned measurement item (for example, the client device processing period) for the concerned coupling in the experienced delay measurement information. Especially, the experienced delay analyzer 161 sets, to "1", a flag included in the update management bitmap 135 and corresponding to a measurement item updated for the current packet among the measurement items in the experienced delay measurement of the concerned coupling. Then, the process proceeds to step S17.

Figure 27:
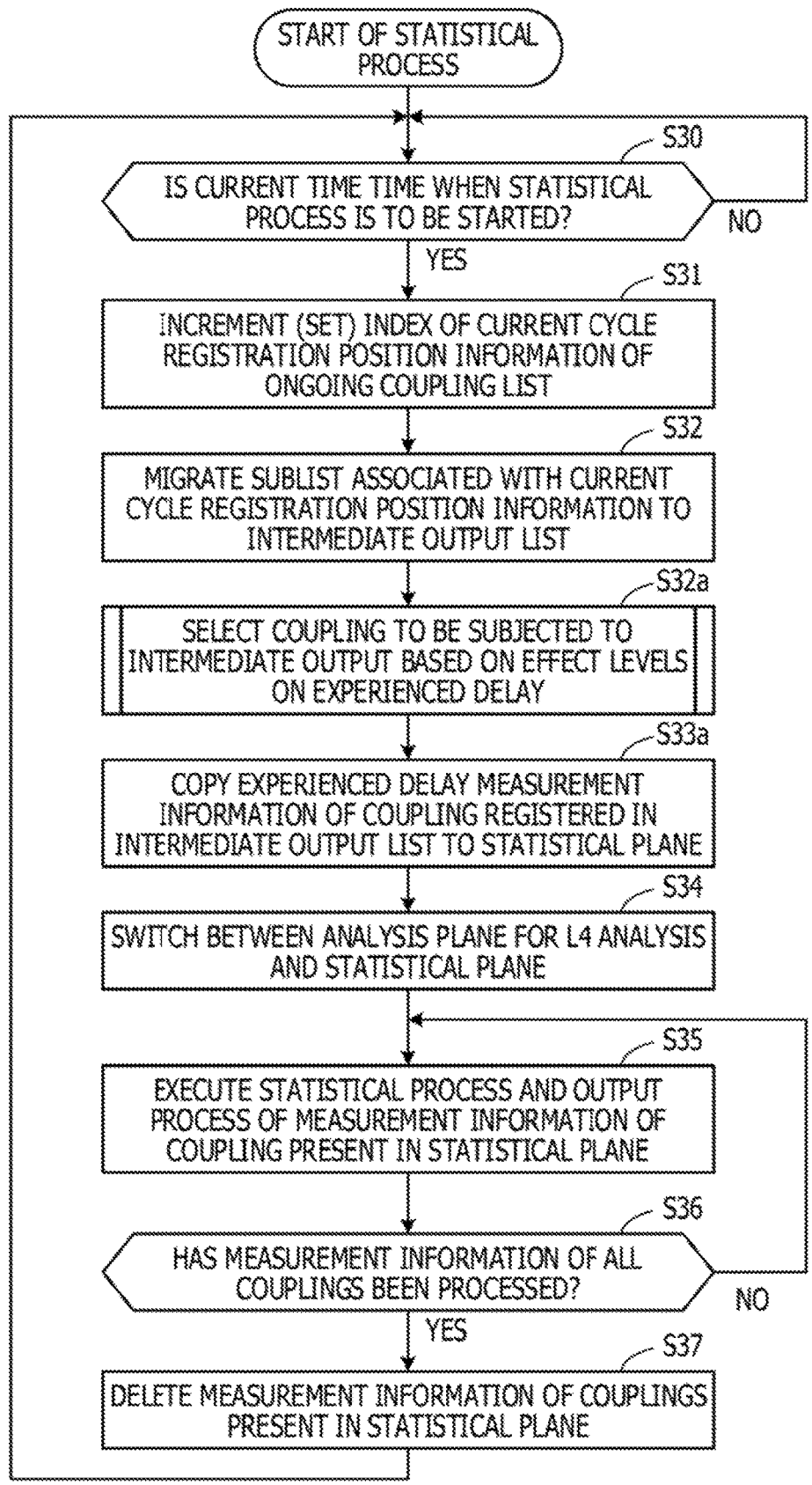
FIG. 27 is a flowchart illustrating an example of the statistical process.

FIG. 27 is a flowchart illustrating an example of the statistical process.

Details of processes of steps S30 to S32 and steps S34 to S37 are the same as or similar to steps S30 to S32 and steps S34 to S37 exemplified in FIG. 15 and will not be described. The monitoring device 100a executes step S32a after step S32 and executes step S33a after step S32a.

(S32a) The intermediate output coupling selector 172 selects a coupling to be subjected to the intermediate output from among couplings indicated in the ongoing coupling list and registered in the intermediate output list 134 based on effect levels (update point pattern table 123b) on an experienced delay and the update management bitmap 135. Details of the selection of the coupling to be subjected to the intermediate output are described later.

(S33a) The statistical processing unit 170a copies, from the experienced delay analysis plane 132 to the experienced delay statistical plane 142, experienced delay measurement information on the coupling that is to be subjected to the intermediate output and has been selected by the intermediate output coupling selector 172 from among the ongoing couplings registered in the intermediate output list 134. Then, the process proceeds to step S34.

Figure 28:
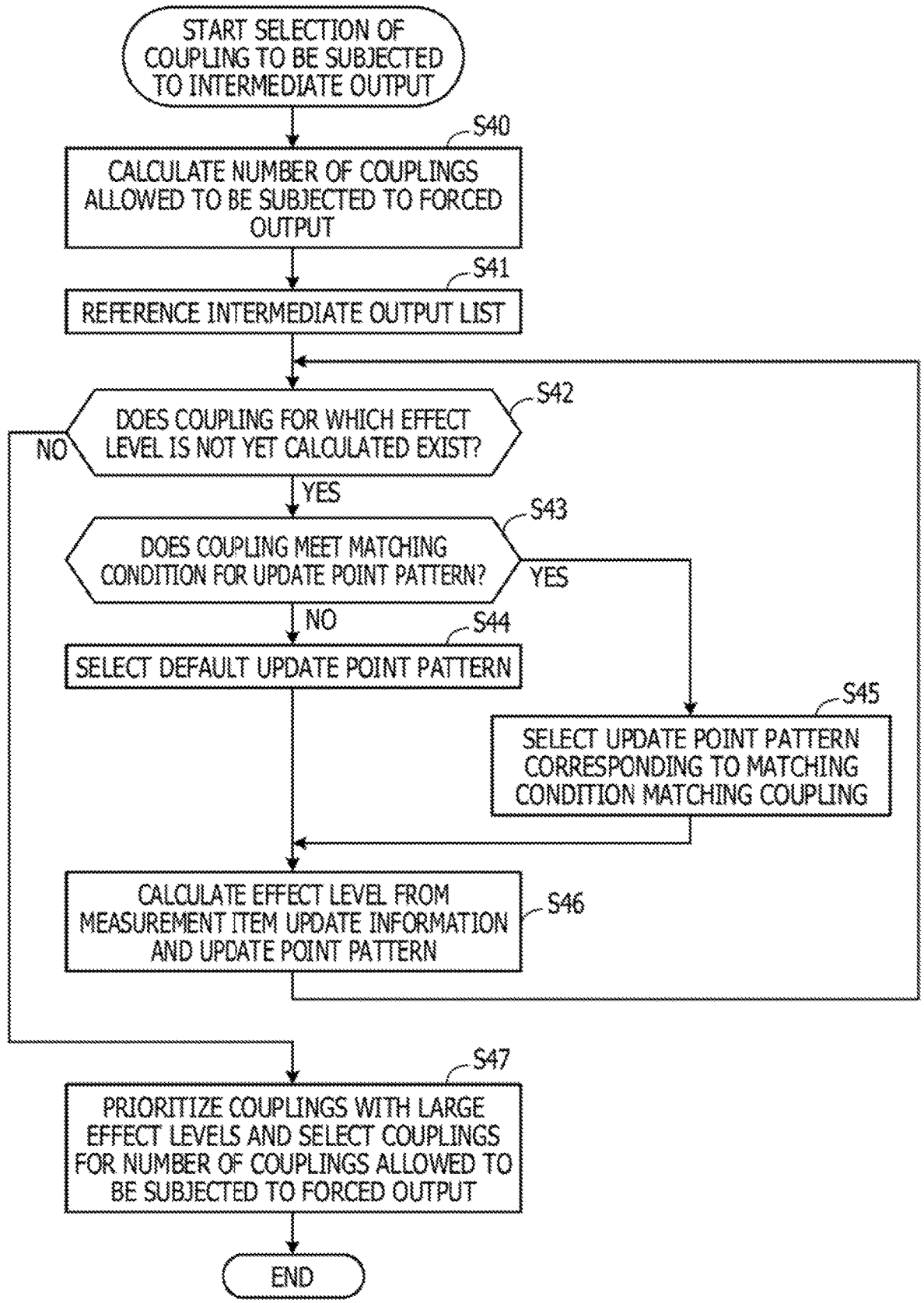
FIG. 28 is a flowchart illustrating an example of the selection of a coupling to be subjected to intermediate output.

FIG. 28 is a flowchart illustrating an example of the selection of the coupling to be subjected to the intermediate output.

The selection of the coupling to be subjected to the intermediate output corresponds to step S32a.

(S40) The intermediate output coupling selector 172 uses Equation (2) to calculate the number of couplings allowed to be subjected to the forced output.

(S41) The intermediate output coupling selector 172 references the intermediate output list 134.

(S42) The intermediate output coupling selector 172 determines whether a coupling for which an effect level is not calculated exists. When the coupling for which the effect level is not calculated exists, the intermediate output coupling selector 172 selects, from the intermediate output list 134, one coupling (ongoing coupling) for which an effect level is not calculated, and the process proceeds to step S43. When the coupling for which the effect level is not calculated does not exist, the process proceeds to step S47.

(S43) The intermediate output coupling selector 172 determines, based on the update point pattern table 123b, whether the selected coupling meets a specific matching condition for an update point pattern. When the selected coupling does not meet the specific matching condition, the process proceeds to step S44. When the selected coupling meets the specific matching condition, the process proceeds to step S45.

(S44) The intermediate output coupling selector 172 selects the default update point pattern from the update point pattern table 123b. Then, the process proceeds to step S46.

(S45) The intermediate output coupling selector 172 selects, from the update point pattern table 123b, the update point pattern meeting the matching condition matching the selected coupling.

(S46) The intermediate output coupling selector 172 calculates an effect level for the selected coupling from update information for each of the measurement items in the update management bitmap 135 and the update point pattern selected in step S44 or S45. Then, the process proceeds to step S42.

(S47) The intermediate output coupling selector 172 prioritizes couplings with large effect levels and selects couplings for the number of couplings allowed to be subjected to the forced output, based on effect levels, calculated in step S46, for the couplings. The intermediate output coupling selector 172 sets, to "0", update information (flags)

for each of the measurement items of the update management bitmap 135. The couplings selected in step S47 are couplings to be subjected to the intermediate output. Then, the selection of the couplings to be subjected to the intermediate output is terminated.

Figure 29:
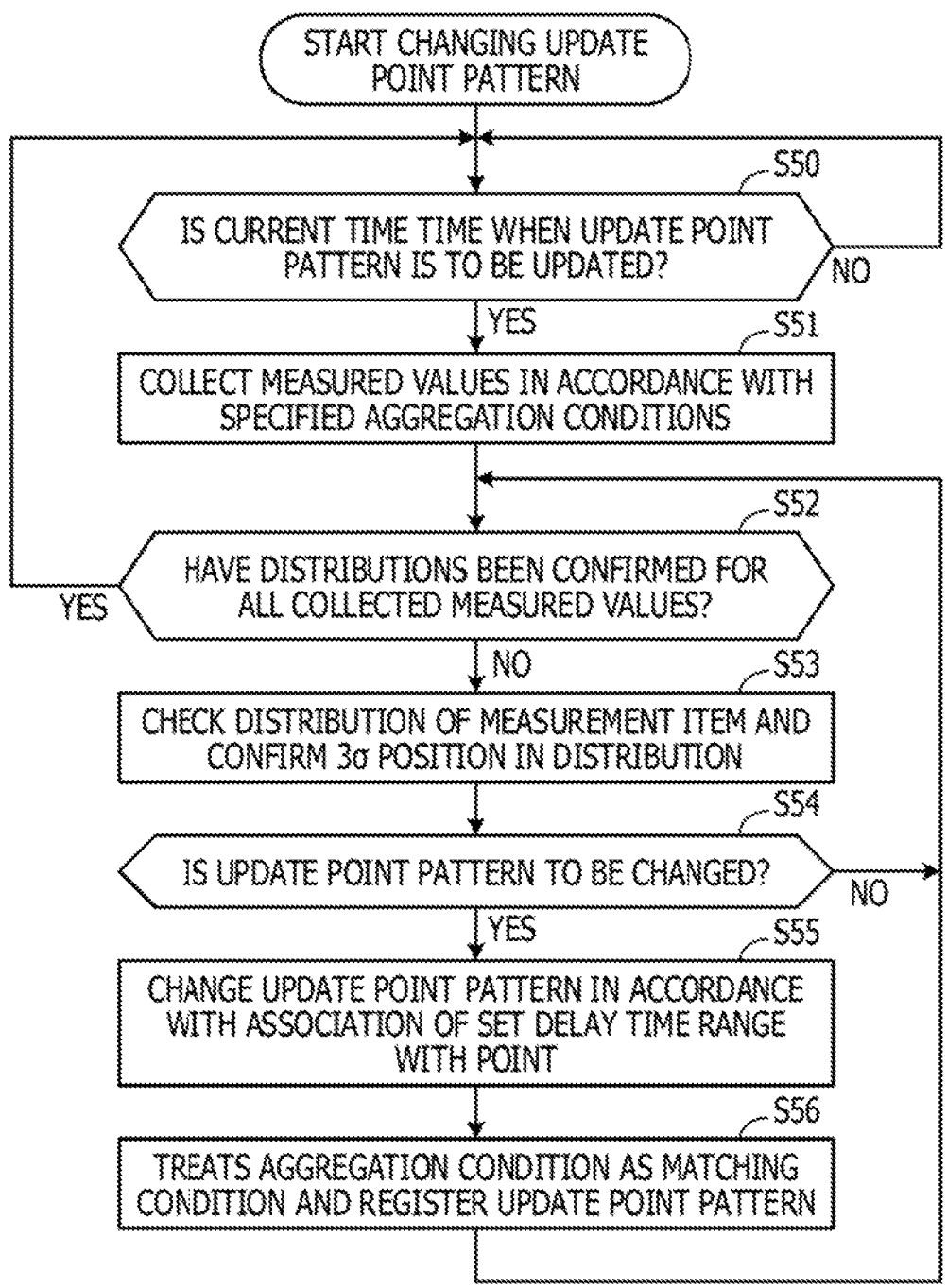
FIG. 29 is a flowchart illustrating an example of a change in an update point pattern.

FIG. 29 is a flowchart illustrating an example of a change in an update point pattern.

(S50) The point pattern updating unit 190 determines whether the current time is the time when the update point pattern in the update point pattern table 123b is to be updated. When the current time is the time when the update point pattern in the update point pattern table 123b is to be updated, a process proceeds to step S51. When the current time is not the time when the update point pattern in the update point pattern table 123b is to be updated, the process proceeds to step S50 (or waits until the current time reaches the time when the update point pattern in the update point pattern table 123b is to be updated). Update intervals at which the point pattern updating unit 190 updates the update point pattern table 123b are set in the point pattern updating unit 190 in advance.

(S51) The point pattern updating unit 190 collects past measured values for each of the measurement items in accordance with aggregation conditions 602 specified by a user. Results of collecting the measured values are generated for each of the aggregation conditions 602 and each of the measurement items.

(S52) The point pattern updating unit 190 determines whether distributions have been confirmed for all the collected measured values. When the distributions have been confirmed for all the collected measured values, the process proceeds to step S50. When a distribution that is not confirmed exists, the point pattern updating unit 190 selects one distribution that is not confirmed, and the process proceeds to step S53.

(S53) The point pattern updating unit 190 checks the distribution of a concerned measurement item and confirms a $3\sigma$ position (=an average value+$3\sigma$) in the distribution.

(S54) The point pattern updating unit 190 determines, based on the comparison of the point standard with the $3\sigma$ position, whether an update point pattern is to be changed for the concerned measurement item of a concerned aggregation condition 602. When the update point pattern is to be changed, the process proceeds to step S55. When the update point pattern is not to be changed, the process proceeds to step S52.

(S55) The point pattern updating unit 190 changes the update point pattern for the concerned measurement item in accordance with the association of a delay time range set for the point standard with a point (or determines the point after the change for the concerned measurement item).

(S56) The point pattern updating unit 190 treats the aggregation condition 602 as a matching condition and registers the update point pattern in the update point pattern table 123b. For example, when a record for the matching condition corresponding to the concerned aggregation condition 602 is not registered in the update point pattern table 123b, the point pattern updating unit 190 adds the record for the matching condition to the update point pattern table 123b. When the record for the matching condition corresponding to the concerned aggregation condition 602 is already registered in the update point pattern table 123b, the point pattern updating unit 190 registers the point after the change in the concerned measurement item in the record. Then, the process proceeds to step S52.

As described above, the system administrator is able to set, in the monitoring device 100a, the number (predetermined number N of times) of statistical cycles in which the forced output is suspended. However, an access pattern of a user who uses a service and an access destination trend vary depending on the service and a service usage time. Therefore, when the statistical cycle has come, information that affects an experienced delay may have already been measured for a coupling for a certain service. Even when the statistical cycle has come, the information that affects the experienced delay may not have been measured. Therefore, by prioritizing a coupling for which information that affects an experienced delay is estimated to have been measured as a target to be subjected to the forced output, a processing load caused by the statistical process executed by the monitoring device 100a on an ongoing coupling may be further reduced.

In this case, the monitoring device 100a uses Equation (2) to determine the number of couplings allowed to be subjected to the forced output so that the statistical process is completed within the time range of the next statistical cycle. Therefore, the monitoring device 100 limits the number of ongoing couplings to be subjected to the statistical process. Therefore, the monitoring device 100a may reduce a delay before the output of analysis results of the NW quality and the experienced delay measurement.

The monitoring device 100a changes an update point pattern in the update point pattern table 123b based on measured values of the measurement items, thereby correcting effect levels of the measurement items on a user-experienced delay. Therefore, the monitoring device 100a is able to appropriately evaluate effect levels of the updated measurement items for each coupling (or service access) based on a service and a service usage time. As a result, an ongoing coupling for which information that affects an experienced delay is likely to have been measured is able to be appropriately selected as a target to be subjected to the forced output.

The information processing according to the first embodiment may be realized by causing the processing unit 12 to a program. The information processing according to the second and third embodiments may be realized by causing the CPU 101 to the program. The program may be stored in a computer-readable storage medium 113.

For example, the program may be distributed by distributing the storage medium 113 storing the program. The program may be stored in another computer and distributed via the network. For example, the computer may store (install) the program stored in the storage medium 113 or received from another computer in a storage device, such as the RAM 102 or the HDD 103, and may read the program from the storage device and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a packet analysis program for causing a computer to execute a process, the process comprising:
   acquiring packets communicated between nodes;
   adding information of communication of ongoing couplings to an ongoing coupling list in each of predetermined time ranges belonging to start times of the couplings based on the packets, and removing information of communication of a terminated coupling from the ongoing coupling list based on the packets; and analyzing the quality of the communication of the terminated coupling in a cycle corresponding to a time range among the time ranges, and analyzing, when every time the cycle has elapsed a predetermined number of times or more after the addition of information of the coupling to the ongoing coupling list, the quality of communication related to a coupling present in the ongoing coupling list.

2. The non-transitory computer-readable storage medium according to claim 1, the process further comprising:

selecting a coupling to be subjected to communication quality analysis from among a plurality of couplings present in the ongoing coupling list, based on effect level information indicating effect levels of delay times for measurement items measured for the couplings on the quality of communication, and update management information indicating whether the measurement items in a previous time range have been updated.

3. The non-transitory computer-readable storage medium according to claim 2, the process further comprising:

calculating, for each of the couplings, the sum of the effect levels for the updated measurement items based on the effect level information and the update management information, prioritizing a coupling for which the sum of effect levels is the largest, and selecting the prioritized coupling as a target to be subjected to the communication quality analysis from among the plurality of couplings.

4. The non-transitory computer-readable storage medium according to claim 2, the process further comprising:

calculating, based on a distribution of past measured values of the delay times for the measurement items, a statistical value corresponding to the distribution, and correcting the effect levels, included in the effect level information, of the measurement items based on the statistical value.

5. The non-transitory computer-readable storage medium according to claim 1, the process further comprising:

estimating a time period for first analysis of the quality of the communication of the terminated coupling, and determining, based on the time period and the cycle, the number of couplings to be subjected to the communication quality analysis among a plurality of couplings present in the ongoing coupling list so that the first analysis and second analysis of the quality of communication related to the couplings present in the ongoing coupling list are completed in a next cycle.

6. The non-transitory computer-readable storage medium according to claim 1, wherein the ongoing coupling list includes a larger number of sublists than the predetermined number of times, and the sublists are repeatedly applied to and associated with the plurality of time ranges corresponding to cycles in order, and every time the cycle elapses, a sublist that is a destination to which information of communication of an ongoing coupling is added is changed in order and the quality of communication related to the couplings present in the sublist after the change is analyzed.

7. A packet analyzing device comprising:

a memory configured to store an ongoing coupling list in which information of communication of an ongoing coupling is recorded; and circuitry configured to acquire packets communicated between nodes, adds information of communication of ongoing couplings to an ongoing coupling list in each of predetermined time ranges belonging to start times of the couplings based on the packets, removes information of communication of a terminated coupling from the ongoing coupling list based on the packets, analyzes the quality of the communication of the terminated coupling in a cycle corresponding to a time range among the time ranges, and analyzes, when every time the cycle has elapsed a predetermined number of times or more after the addition of information of the coupling to the ongoing coupling list, the quality of communication related to a coupling present in the ongoing coupling list.

8. The packet analyzing device according to claim 7, wherein the circuitry is configured to select a coupling to be subjected to communication quality analysis from among a plurality of couplings present in the ongoing coupling list, based on effect level information indicating effect levels of delay times for measurement items measured for the couplings on the quality of communication, and update management information indicating whether the measurement items in a previous time range have been updated.

9. The packet analyzing device according to claim 8, wherein the circuitry is configured to calculate, for each of the couplings, the sum of the effect levels for the updated measurement items based on the effect level information and the update management information, prioritizes a coupling for which the sum of effect levels is the largest, and selects the prioritized coupling as a target to be subjected to the communication quality analysis from among the plurality of couplings.

10. The packet analyzing device according to claim 8, wherein the circuitry is configured to calculate, based on a distribution of past measured values of the delay times for the measurement items, a statistical value corresponding to the distribution, and correcting the effect levels, included in the effect level information, of the measurement items based on the statistical value.

11. The packet analyzing device according to claim 7, wherein the circuitry is configured to estimate a time period for first analysis of the quality of the communication of the terminated coupling, and determines, based on the time period and the cycle, the number of couplings to be subjected to the communication quality analysis among a plurality of couplings present in the ongoing coupling list so that the first analysis and second analysis of the quality of communication related to the couplings present in the ongoing coupling list are completed in a next cycle.

12. The packet analyzing device according to claim 7, wherein the ongoing coupling list includes a larger number of sublists than the predetermined number of times, and the sublists are repeatedly applied to and associated with the plurality of time ranges corresponding to cycles in order, and every time the cycle elapses, a sublist that is a destination to which information of communication of an ongoing coupling is added is changed in order and the quality of communication related to the couplings present in the sublist after the change is analyzed.

* * * * *